United States Patent
Mohan et al.

(10) Patent No.: US 6,970,881 B1
(45) Date of Patent: Nov. 29, 2005

(54) CONCEPT-BASED METHOD AND SYSTEM FOR DYNAMICALLY ANALYZING UNSTRUCTURED INFORMATION

(75) Inventors: Rengaswamy Mohan, Jacksonville, FL (US); Usha Mohan, Jacksonville, FL (US)

(73) Assignee: Intelligenxia, Inc., Jacksonville, FL (US)

( * ) Notice: Subject to any disclaimer, the term of this patent is extended or adjusted under 35 U.S.C. 154(b) by 324 days.

(21) Appl. No.: 10/087,053

(22) Filed: Mar. 1, 2002

Related U.S. Application Data

(60) Provisional application No. 60/302,971, filed on May 7, 2001.

(51) Int. Cl.[7] ............................................. G06F 17/30
(52) U.S. Cl. ..................................................... 707/102
(58) Field of Search ........................................ 707/102

(56) References Cited

U.S. PATENT DOCUMENTS

| | | | |
|---|---|---|---|
| 5,278,980 A | * | 1/1994 | Pedersen et al. ............... 707/4 |
| 5,295,256 A | * | 3/1994 | Bapat .......................... 717/137 |
| 5,418,951 A | | 5/1995 | Damashek |
| 5,488,725 A | * | 1/1996 | Turtle et al. .................... 707/5 |
| 5,555,408 A | | 9/1996 | Fujisawa et al. |
| 5,592,667 A | * | 1/1997 | Bugajski ...................... 707/102 |
| 5,619,709 A | | 4/1997 | Caid et al. |
| 5,634,051 A | | 5/1997 | Thomson |
| 5,727,950 A | * | 3/1998 | Cook et al. .................. 434/350 |
| 5,761,496 A | | 6/1998 | Hattori |
| 5,768,578 A | | 6/1998 | Kirk et al. |
| 5,794,178 A | | 8/1998 | Caid et al. |
| 5,819,260 A | | 10/1998 | Lu et al. |
| 5,832,470 A | | 11/1998 | Morita et al. |
| 5,867,799 A | | 2/1999 | Lang et al. |
| 5,884,305 A | | 3/1999 | Kleinberg et al. |
| 5,933,822 A | | 8/1999 | Braden-Harder et al. |
| 5,983,214 A | | 11/1999 | Lang et al. |
| 5,987,447 A | | 11/1999 | Chang et al. |
| 6,006,221 A | | 12/1999 | Liddy et al. |
| 6,026,388 A | | 2/2000 | Liddy et al. |
| 6,029,161 A | | 2/2000 | Lang et al. |
| 6,038,561 A | | 3/2000 | Snyder et al. |
| 6,055,526 A | | 4/2000 | Ambroziak |
| 6,101,491 A | | 8/2000 | Woods |

(Continued)

OTHER PUBLICATIONS

Giger, H.P., "Concept Based Retrieval in Classical IR Systems," Proceedings of the International Conference on Research and Development in Information Retrieval, NY, NY, ACM, vol. CONF. 11, pp. 275-289.

(Continued)

Primary Examiner—Wayne Amsbury
(74) Attorney, Agent, or Firm—Sterne, Kessler, Goldstein & Fox PLLC

(57) ABSTRACT

A method, operating model, system, data structure, computer program and computer program product for analyzing and categorizing unstructured information is provided such that conventional structured data access techniques can be utilized over unstructured objects. A analysis and categorization engine builds a set of concept groupings, each grouping consisting of related words and phrases. The concept groupings are augmented by user input. A set of categories is built. The analysis and categorization engine generates a vector representation of each object based on concepts and utilizes a statistical analysis to select concepts that represent each object and assign objects to categories. Information about users, objects, and categories is stored in an open architecture, such as a relational database. An object concept based search is provided to efficiently locate meaningful objects and to provide for updating of the object categorization based on search entries.

40 Claims, 11 Drawing Sheets

U.S. PATENT DOCUMENTS

| | | | |
|---|---|---|---|
| 6,101,492 | A | 8/2000 | Jacquemin et al. |
| 6,122,628 | A | 9/2000 | Castelli et al. |
| 6,182,063 | B1 | 1/2001 | Woods |
| 6,199,034 | B1 * | 3/2001 | Wical .............................. 704/9 |
| 6,233,575 | B1 | 5/2001 | Agrawal et al. |
| 6,236,987 | B1 | 5/2001 | Horowitz et al. |
| 6,263,335 | B1 | 7/2001 | Paik et al. |
| 6,289,382 | B1 * | 9/2001 | Bowman-Amuah ......... 709/226 |
| 6,308,175 | B1 | 10/2001 | Lang et al. |
| 6,314,420 | B1 | 11/2001 | Lang et al. |
| 6,327,593 | B1 | 12/2001 | Gioffon |
| 6,366,908 | B1 | 4/2002 | Chong et al. |
| 6,424,973 | B1 | 7/2002 | Baclawski |
| 6,453,339 | B1 * | 9/2002 | Schultz et al. .............. 709/206 |
| 6,611,825 | B1 | 8/2003 | Billheimer et al. |
| 6,675,159 | B1 * | 1/2004 | Lin et al. ....................... 707/3 |
| 6,701,305 | B1 | 3/2004 | Holt et al. |
| 2002/0007373 | A1 | 1/2002 | Blair et al. |
| 2002/0069203 | A1 | 6/2002 | Dar et al. |
| 2002/0107844 | A1 | 8/2002 | Cha et al. |
| 2002/0120609 | A1 | 8/2002 | Lang et al. |
| 2002/0129015 | A1 | 9/2002 | Caudill et al. |
| 2003/0149586 | A1 | 8/2003 | Chen et al. |

OTHER PUBLICATIONS

H.C. Arents et al., "Concept-Based Retrieval of Hypermedia Information: From Term Indexing to Semantic Hyperindexing," Information processing & Management vol. 29, No. 3, pp. 373-386, 1993.

Bhatia et al., "Conceptual Clustering in Information Retrieval," Systems, Man, and Cybernetics, Part B, IEEE Transactions, v. 28, issue 3, pp. 427-436.

Belew, Richard, "A Connectionist Approach to Conceptual Information Retrieval," ICAIL '87, pp. 116-126 (1987).

* cited by examiner

CONCEPT-BASED METHOD AND SYSTEM FOR DYNAMICALLY ANALYZING UNSTRUCTURED INFORMATION

RELATED APPLICATION

This application claims priority under 35 U.S.C. §119(e) and/or 35 U.S.C. §120 to U.S. Provisional Patent Application Ser. No. 60/302,971, entitled System For And Method Of Intelligent Categorization Of Information, filed May 7, 2001, which is hereby incorporated by reference.

FIELD OF THE INVENTION

This invention pertains generally to a system, method, and computer program product for information classification, retrieval, gathering, and analysis; and more particularly to a system, method, and computer program product for classifying, gathering, classifying, categorizing and analyzing unstructured information.

BACKGROUND

Structured data or objects generally refers to data existing in an organized form, such as a relational database, that can be accessed and analyzed by conventional techniques (i.e. Standard Query Language, SQL). By contrast, so-called unstructured data or objects refers to objects in a textual format (i.e. faxes, e-mails, documents, voice converted to text) that do not necessarily share a common organization. Unstructured information often remains hidden and un-leveraged by an organization primarily because it is hard to access the right information at the right time or to integrate, analyze, or compare multiple items of information as a result of their unstructured nature. There exists a need for a system and method to provide structure for unstructured information such that the unstructured objects can be accessed with powerful conventional tools (such as, for example, SQL, or other information query and/or analysis tools) and analyzed for hidden trends and patterns across a corpus of unstructured objects.

Conventional systems and methods for accessing unstructured objects have focused on tactical searches, that seek to match keywords, an approach that has several shortcomings. For example, as illustrated in FIG. 1, a tactical search engine 110 accepts search text 100. For purposes of illustration, suppose information about insects is desired and the user-entered search text 100 is 'bug'. The search engine scans available unstructured objects 115, including individual objects 120, 130, 140, 150, and 160. In this example, one unstructured object concerns the Volkswagen bug 120, one is about insects at night 130, one is about creepy-crawlies 140, one is about software bugs 150, and one is about garden bugs 160. The tactical search engine 110 performs keyword matching, looking for the search text 100 to appear in at least one of the unstructured objects 115. In this 'bug' example, only those objects about the Volkswagen bug 120, software bugs 150, and garden bugs 160 actually contain the word 'bug' and will be returned 170. The objects about insects at night 130, and creepy-crawlies 140 may have been relevant to the search but unfortunately were not identified by the conventional tactical search engine.

One conventional method of addressing this problem allows a user to enter detailed searches utilizing phrases or Boolean logic, but successful detailed tactical searches can be extremely difficult to formulate. The user must be sophisticated enough to express their search criteria in terms of Boolean logic. Furthermore, the user needs to know precisely what he or she is searching for, in the exact language that they expect to find it. Thus, there is a need for a search mechanism to more easily locate documents or other objects of interest, preferably searching with the user's own vocabulary. Further, such mechanism should desirably enable automatically searching related words and phrases, without knowledge of advanced searching techniques.

In another conventional method, the search is done based on meaning, where each of the words or phrases typed is semantically analyzed, as if second guessing the user (for example, Use of the term Juvenile picks up teenager). This increases the result set though, making analysis of search results even more important. Also this technique is inadequate and quite inaccurate when the user is looking for a concept like "definition of terrorism" or "definition of knowledge management", where the "concept" of the phrase is more important than the meaning of the individual words in the search term.

Even when tactical searches succeed in searching or finding information, the problem of analyzing unstructured information still remains. Analyzing unstructured information goes beyond the ability to locate information of interest. Analysis of unstructured information would allow a user to identify trends in unstructured objects as well as quickly identify the meaning of an unstructured object, without first having to read or review the entire document. Thus, there further exists a need to provide a system and methodology for analyzing unstructured information. In one situation, this need extends to system and method for tracking and optionally reporting the changing presence of words or phrases in a set of documents over time.

Prior art classification systems exist that can organize unstructured objects in a hierarchical manner. However, utilizing these classification systems to locate an object of interest requires knowing what the high-level of interest would be, and following one path of inquiry often precludes looking at other options. Thus, there is also a need for a system and method that can recognize relevant relationships between words and concepts, and can categorize an object under more than one high-level interest. Such a system and method should desirably scan objects for words or phrases and determine the presence of certain patterns that suggest the meaning, or theme, of a document, allowing for more accurate classification and retrieval.

Some prior art technologies store data and information utilizing proprietary methods and/or data structures, which prevents widespread or open access or analysis by keeping objects in a native non-standard proprietary format. Thus, there is a need to store information about unstructured objects in an open architecture and preferably in a readily accessible standard storage format, one embodiment being a relational database of which many types are known. Storage in a relational database keeps the information readily available for analysis by common tools. Where access protection is desired various known security measures may be employed as are known in the art. In short, there remains a need for a theme or concept-based method and system to analyze, categorize and query unstructured information. The present invention provides such a high precision system and method.

SUMMARY

The present invention provides a system, method and computer program and computer program product for categorizing and analyzing unstructured information. The present invention includes a analysis and categorization engine that scans available unstructured objects. The analysis and categorization engine generates structured information in the form of relational database tables, and can accept user-specific input to personalize this process further. Once these relational database data structures have been generated, conventional techniques (such as SQL) can therefore be utilized on the structured information to access the unstructured objects.

The analysis and categorization engine preferably builds a set of categories into which it will classify the unstructured objects. By scanning the categories or further training, the analysis and categorization engine captures a list of relevant concepts, where preferably each relevant concept comprises at least one word. Utilizing language relationships, thesaurus, other industry/language thesaurus and/or dictionary-lookup, the analysis and categorization engine expands the concepts into concept groupings. Each concept grouping preferably comprises at least one word and is named by a representative seed concept of at least one word. The concept groupings may be further augmented by user input and modification, allowing the analysis and categorization engine to capture language relationships and usage unique to individual users.

The analysis and categorization engine can bubble up or otherwise identify ideas and concepts embedded in a given set of unstructured data objects and present them in a structured or organized form, such as for example like a "table of contents for a magazine". One difference being that in this case, the table of contents provides a dynamically organized collection of concepts embedded in the objects. The collection can be dynamically sorted in multiple ways for the user to access the right set of concepts and view their distribution in the targeted objects.

The analysis and categorization engine receives and filters unstructured objects, and indexes objects utilizing the concept groupings and a variation of the term frequency-inverse document frequency (Tf-Idf) technique. Indexing results in a representation of the object as a selection of weighted concepts. The analysis and categorization engine preferably generates a Gaussian distribution curve for the object to assign probabilities to concepts within the object. Concepts having probabilities within a certain range are selected as key concepts to represent the theme, or meaning, of an object. By setting the range, it possible to dramatically increase precision and recall for objects classification. The analysis and categorization engine utilizes the key concepts and their probabilities to determine an object's score for each category, and associates an object with every category achieving a specified score.

Output generated by the analysis and categorization engine such as concept groupings, object scores, and the users to whom they pertain may be stored in an open architecture format, such as a relational database table. Such storage enables conventional analysis techniques to be employed over unstructured data.

Aspects of the invention also provide an object concept based search engine. The search engine accepts search text, analyzes the text for concepts and retrieves objects represented by those concepts. User preferences are learned by the search engine through passing previously unknown concepts extracted from the query text to the analysis and categorization engine. The analysis and categorization engine incorporates the new concepts into the concept groupings and updates its object scoring based on the new concept groupings.

A novel graphical user interface is also optionally but advantageously provided to assist the user in viewing, organizing, and analyzing unstructured objects, and performing the object concept search and subsequent analysis. The structured information generated by the analysis and categorization engine facilitates integrated views of unstructured objects by concept as well as analysis—for example, capturing trends over time.

Other features and advantages of the invention will appear from the following description in which the preferred embodiments have been set forth in detail, in conjunction with the accompanying drawings.

DETAILED DESCRIPTION OF EMBODIMENTS

Exemplary embodiments are described with reference to specific structural and methodological embodiments and configurations. Those workers having ordinary skill in the art in light of the description provided here will appreciate that various changes and modifications can be made while remaining within the scope of the claims. For example, the categorization process is presented in a preferred order utilizing preferred (Gaussian) statistics; however, ordering the steps differently or utilizing a different statistical methodology could achieve the same or analogous end. Examples of relational database tables are given, but those skilled in the art will appreciate that these tables could be structured differently and remain within the scope of the claims. Other variations, changes, and/or modifications may be made without departing from the scope of the invention.

The inventive system, method, data structure, and computer program software and computer program software product have particular applicability to information and intelligence gathering and analysis. Such information and intelligence identification, gathering, and analysis may be applied in economic, financial, technological, sociological, informatics, educational and learning, and security contexts, as well as in many other disciplines.

Figure 1:
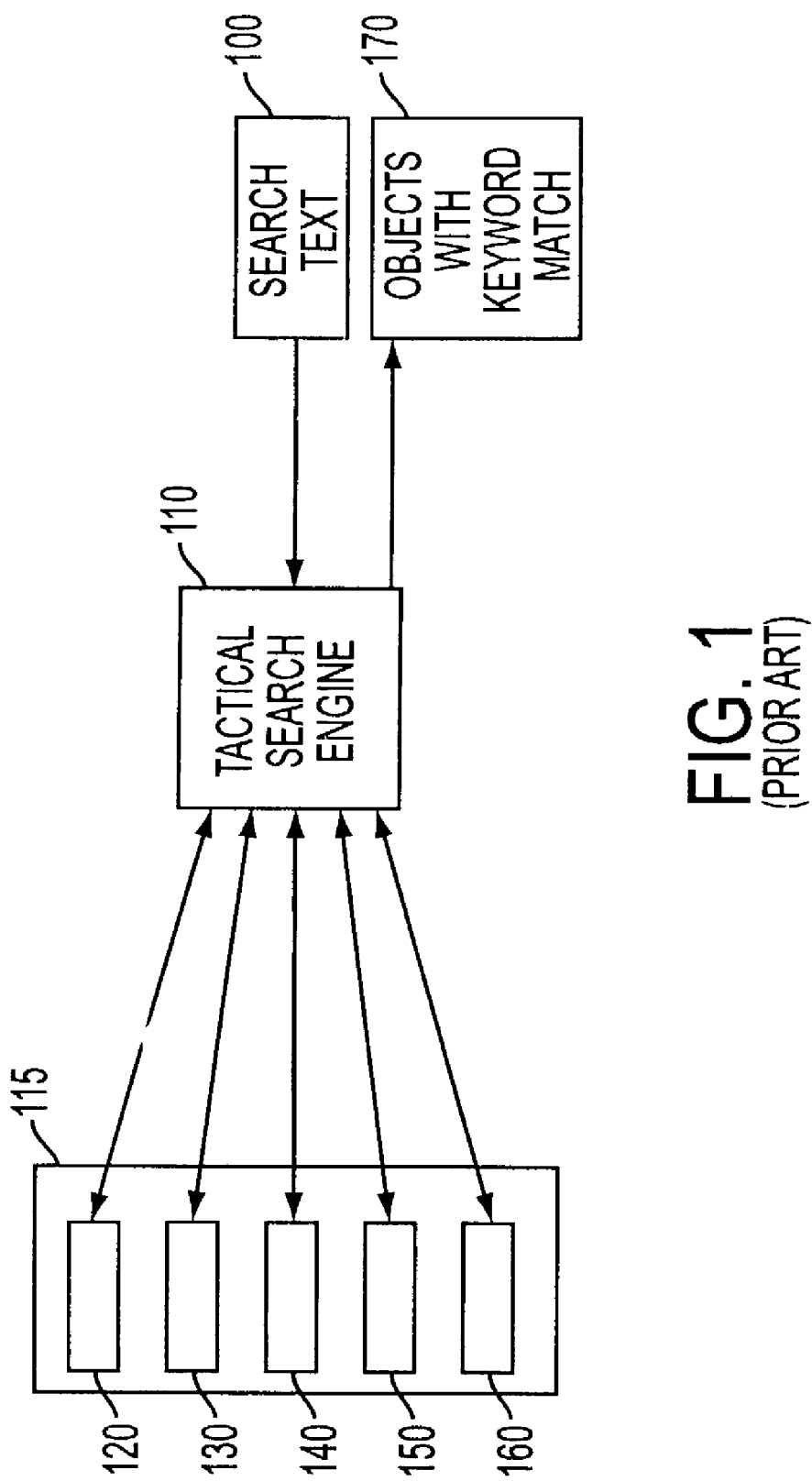
FIG. 1 illustrates a conventional tactical search engine, and the manner in which a tactical search is performed.
Figure 2:
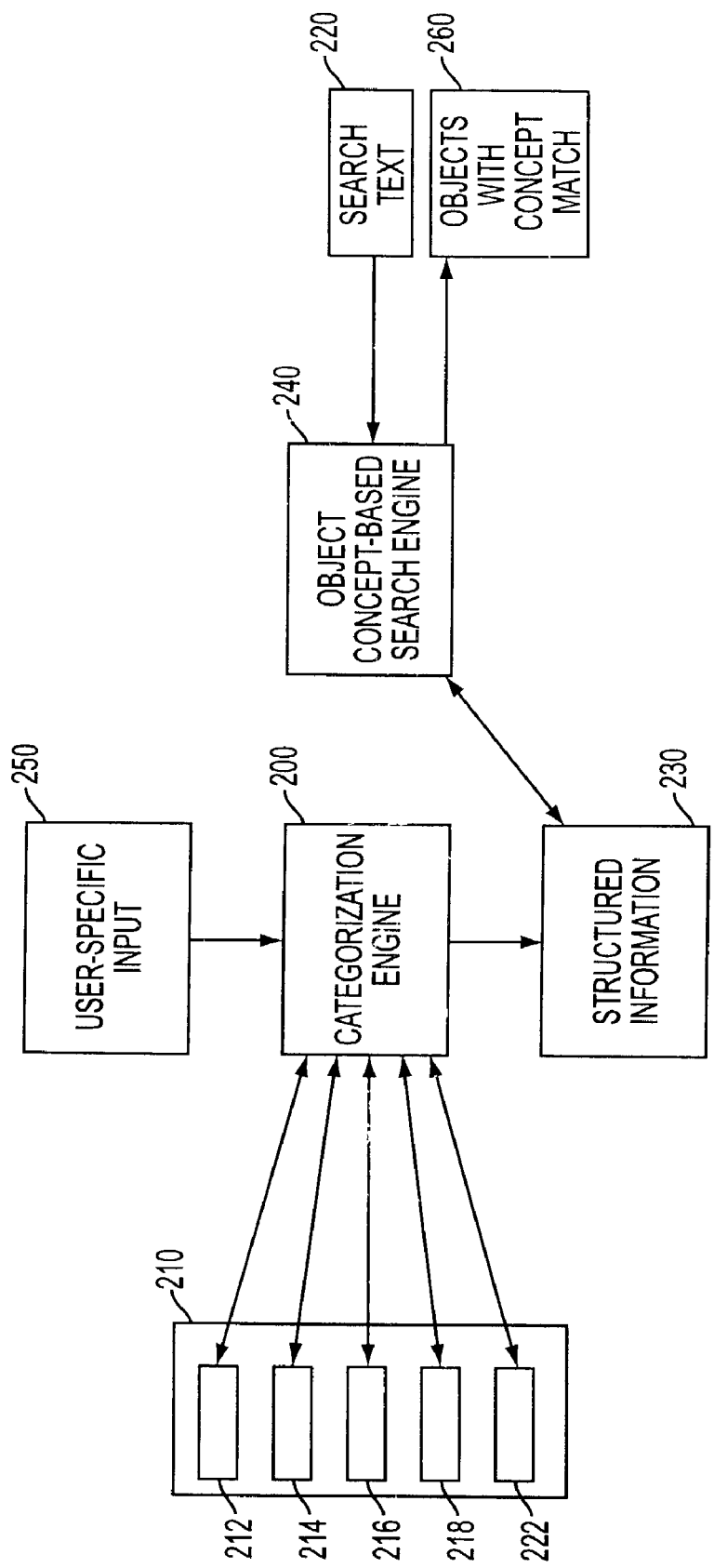
FIG. 2 is an outline of the structure of a system to categorize and analyze unstructured information, according to an embodiment of the present invention.

With reference to FIG. 2, there is illustrated an outline of the organization of an embodiment of the present system to categorize, search, and deduce the theme, or meaning, of unstructured information. A analysis and categorization engine 200 accesses unstructured objects 210, including individual unstructured objects 212, 214, 216, 218, and 222. The analysis and categorization engine 200 also accepts user-specific input 250 and can include search text 220. Based on the unstructured objects 210, the user input 250 and search text 220, the analysis and categorization engine 200 generates structured information 230. Conventional analysis tools can be employed to access or analyze the unstructured objects 210 through this structured information 230. One embodiment of the present invention provides an object concept-based search engine 240. The search engine 240 accepts search text 220 and utilizes the structured information 230 generated by the analysis and categorization engine 200 to return unstructured objects having a concept match 260. Unlike the conventional approach of FIG. 1, the approach illustrated in the FIG. 2 embodiment includes a search capability but returns objects with a concept, not keyword, match and advantageously returns relevant unstructured objects having a conceptual match to the search text even if the text of the returned object does not contain any of the search words. This is different from extracting objects having the concept of what was typed in which is interpolating the typed in text, generating conceptually matching words or phrases and looking for presence or absence of them in the targeted object space. It is further noted that their may optionally be a connection between search text 220 and analysis and categorization engine 200 as any search criteria may further refine the engine's understanding of the user.

Figure 3:
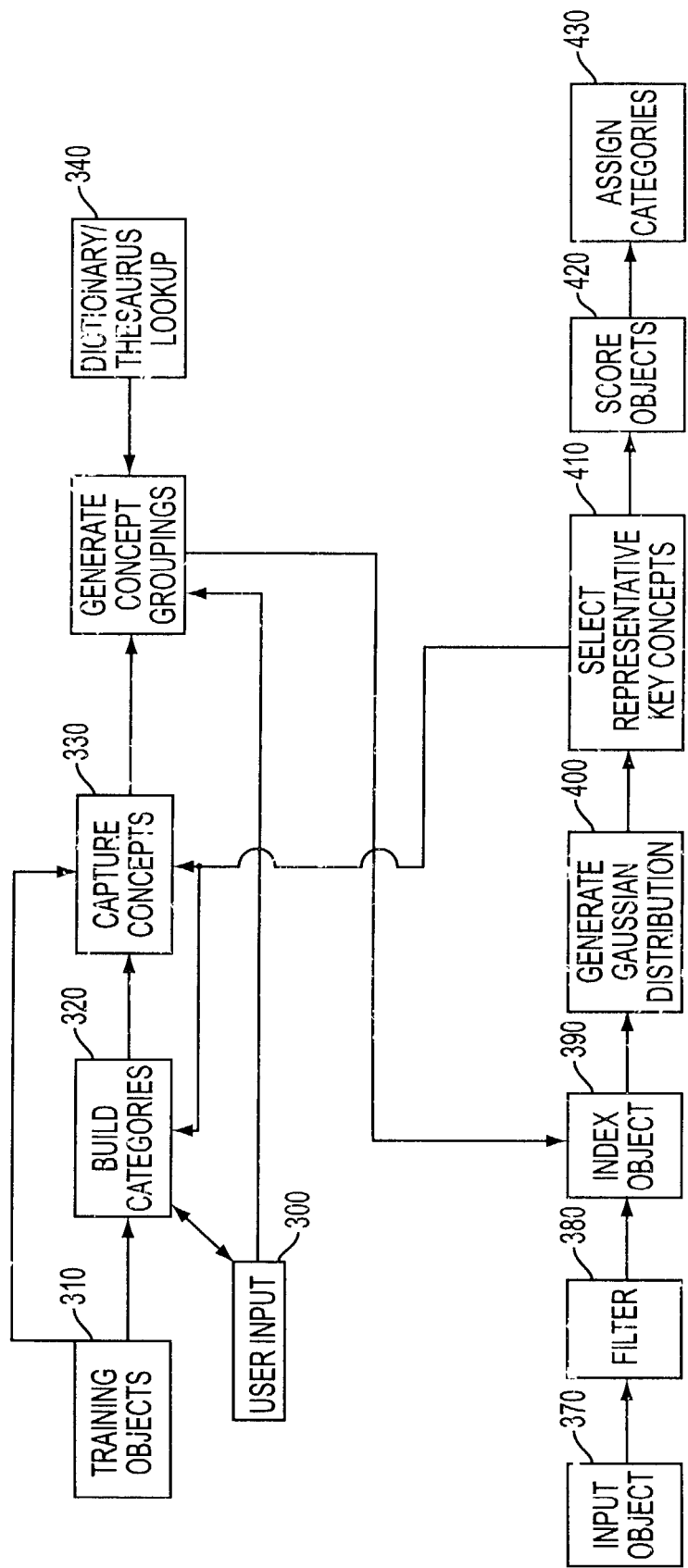
FIG. 3 is an outline of the procedure performed by the analysis and categorization engine, according to an embodiment of the present invention.

An embodiment of the analysis and categorization engine 200 operates as outlined in FIG. 3 to generate or otherwise determine structured information from or about unstructured objects. This generation or determination is described in greater detail hereinafter. Briefly, the analysis and categorization engine 200 generates, determines, or builds categories (step 320) and assigns unstructured objects 210 to categories (step 430). A 'category' as used herein denotes a set of words or phrases that become related to one another when they are grouped or otherwise identified as forming or belonging to a category.

User input 300 and/or training objects 310 are utilized by the analysis and categorization engine to build (step 320) categories. The analysis and categorization engine 200 uses the built categories to capture concepts (step 330). A 'concept' as used herein denotes a word or phrase. With further user input 300 and a dictionary or thesaurus look-up (step 340), the analysis and categorization engine generates concept groupings (step 360). A 'concept grouping' as used herein denotes a group of concepts related in one or more predefined ways—such as synonyms or meaning words and phrases discovered in a dictionary look-up or set up by the user using a concept customization interface. Each concept grouping is headed, or named, by one concept—referred to herein as a seed concept.

The analysis and categorization engine 200 accepts an unstructured object as input (step 370), filters the object (step 380) and utilizes the concept groupings to index the object (step 390). Indexing, as generally known in information retrieval, refers to representing an object as a function of the parameters that will be utilized to search, analyze, or retrieve the object. In a preferred embodiment of the present invention, the indexing step 390 comprises generating a vector representation of the object, having a number of dimensions where each dimension has a weight. Each dimension corresponds to a seed concept, and the weight given to each seed concept depends in part on the frequency of occurrence of that concept within the object.

The index is utilized by the analysis and categorization engine 200 to generate a Gaussian distribution (step 400) of weights for each object and select a set of concepts to represent each object (step 410), herein referred to as key concepts. The objects are scored (step 420) and assigned to categories (step 430). Recall as described relative to FIG. 2 that the analysis and categorization engine stores the information it extracts in a structured open architecture format 230 for use by available structured analysis tools and the provided interface.

Embodiments of the present invention illustrating a more detailed description of the steps outlined in FIG. 3 is given below. Throughout the steps taken by the analysis and categorization engine, as outlined in FIG. 3, output or information generated or determined by the analysis and categorization engine is stored as structured information 230 in an open architecture format. In the embodiments below, specific examples of exemplary relational database tables containing preferred output of the analysis and categorization engine are described. It is to be understood that a variety of information output from any stage of the analysis and categorization engine's procedure may be stored, or may not be stored, while remaining within the scope of the present invention.

With reference to FIG. 3, one or more unstructured objects are input (step 370) and optionally but advantageously filtered (step 380), to remove first predetermined undesired information and/or to extract only other second predetermined information. In one embodiment, the filtering involves removing one or more of formatting characters, special characters and encoding of information. Other or different characters or information may also be removed when present. It is noted that for certain image files (for example, JPEG, GIF, TIFF, or BMP file types) or other file or information items that do not necessarily provide a title, there may not be a concept that is extracted from such no-existent title. The output of the filtering process (step 380) is a filtered object—preferably extracted text along with properties of the unstructured object, such as created date, size, title, description, and modified date. Filters are widely available and known in the art for most object formats. It is noted that for certain image files (for example, JPEG, GIF, TIFF, or BMP file types) or other file or information items that do not necessarily provide a title, there may not be a concept that is extracted from such no-existent title.

Advantageously, each object is available for access using the Universal Naming Convention (UNC) or via some other procedure for providing a unique (globally or locally unique) identifier or ID. The UNC is a way to identify a shared file in a computer without having to specify (or know) the storage device it is on. In the Microsoft Windows operating system, the naming format is \\servername\sharename\path\filename. Analogous naming formats are known for other operating systems. Each unstructured object is stored on one or more computer storage media accessible to the analysis and categorization engine through the UNC. A pointer 30 to the object's physical storage location is generated, for example, by the engine as an integer between −2,147,483,648 to 2,147,483,647. Other methods of generating a physical pointer may be utilized. The pointer 30 is advantageous in that an object can be viewed or analyzed by more than one user without the need to physically copy the object and consume additional space on the computer storage media. Object properties may also be stored in a relational database table. Object properties may include, for example, a string of text representing an object description 34 such as a name or file type, an object created date 36 comprising a numeric string representing the day, month, and year the object was created, and an object modified date 38 comprising a numeric string representing the day, month, and year the object was last modified. A variety of object properties could be stored utilizing a variety of storing methodologies or naming protocols.

In one exemplary object relational database table, shown here as Table 1, the global object IDs 30 and object properties, such as object description 34, object created date 36, object modified date 38, and the object size 40 in bytes [are stored as structured information 230 in an open architecture format, a relational database table. Other object properties, attributes, and the like may also be stored in the object relational database table and tracked,

TABLE 1

| Global Object ID (30) | Object description (34) | Object created date (36) | Object modified date (38) | Object size (units) (40) |
|---|---|---|---|---|
| 500 | INNOVATION Dec 16.txt | 12/15/96 | 12/16/96 | 50000 |
| 501 | INNOVATION May 16.txt | 5/15/96 | 12/1/96 | 250000 |
| ... | ... | ... | ... | ... |

Figure 4:
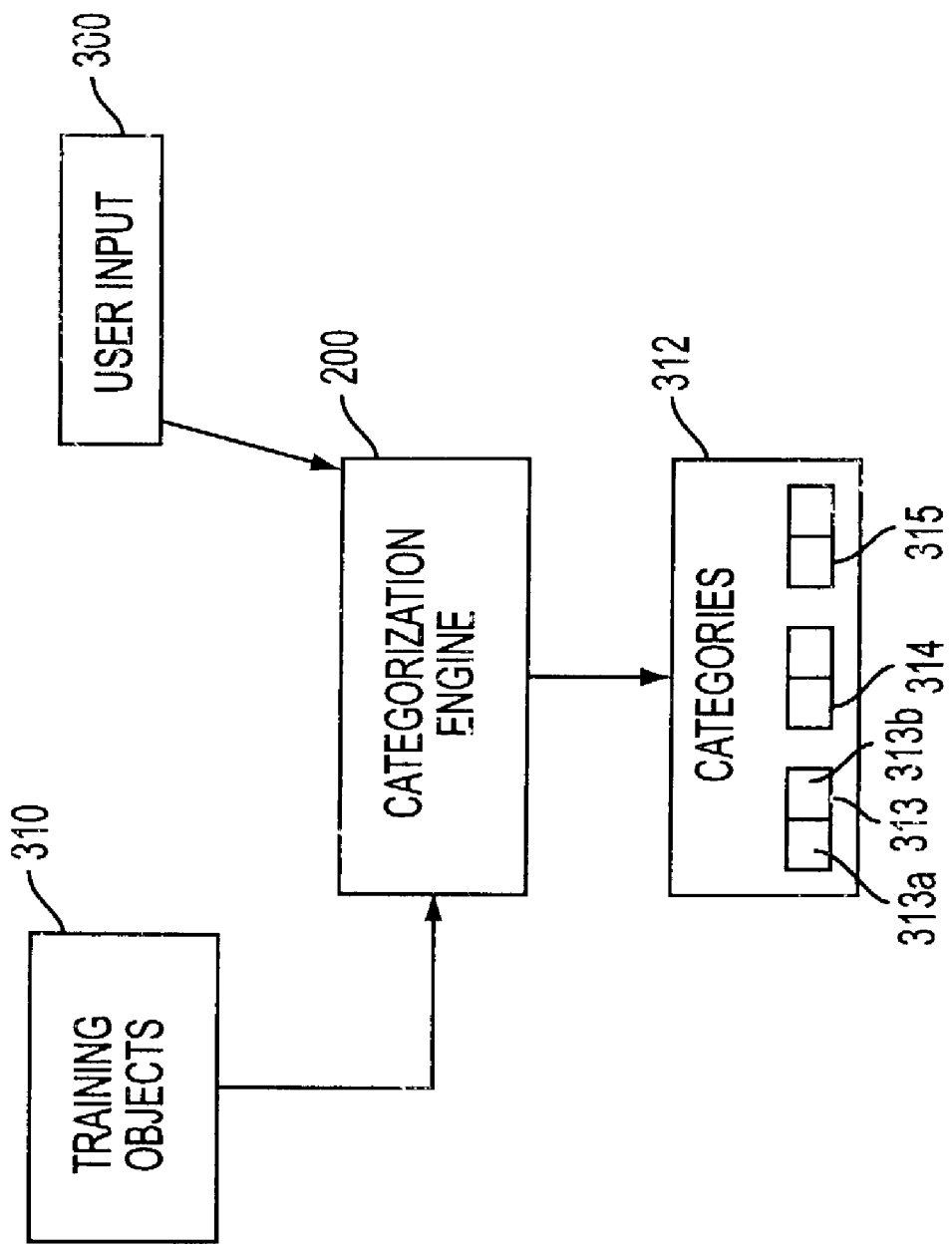
FIG. 4 illustrates the formation of categories according to an embodiment of the present invention.

As illustrated in the embodiment of FIG. 4, categories 312, including individual categories 313, 314, and 315 are built (step 320 of FIG. 3) by the analysis and categorization engine 200 after scanning a set of training objects 310, or in concert with user input 300, or by a combination of these two approaches. One exemplary structure for forming a category is to provide or otherwise generate a category name 313a and a category description 313b that together define the category 313. A description is a set of words that are in some way related to the category name, and defines the category further. Categories may be specific to a user, or groups of users, and may be built through user input or by automatically training the analysis and categorization engine 200 on a set of objects, or through a combination of these two techniques. Three exemplary embodiments of category building techniques are described immediately below.

In a first exemplary embodiment, (1) a user 300 inputs both category name 313a and description 313b. In this case, the user provides the category name or other category identification and a description of the category, where these are desirably provided in natural language. A natural language description is, generally, a descriptive sentence or paragraph further refining what the category name is meant to signify for the user. One illustrative example is:

Category name: Golf
User-generated category description: Game played with drivers or woods and irons. TPC, US Open, British Open, Australian Open and the Masters at Augusta are the events I like the most.

In a second exemplary embodiment, (2) user 300 inputs category name 313a and the analysis and categorization engine 200 generates the corresponding category description 313b. In this case, the user provides the name of the category and a number of training objects 310 forming or belonging to the category. The analysis and categorization engine 200 scans the training objects 310 to generate a set of descriptive words and/or phrases to use as the category description 313b. One illustrative example is:

Category name: Golf
The user uploads a number of documents or information items (or identifies references to documents or other information), such as, for example, web sites on Golf game, US open, British open, Australian open and TPC tour; books, periodicals, or publications; or other sources of information which would provide descriptive input for a golf category.
Analysis and categorization engine-generated category description: Golf, woods, irons, US, British, Australian, shots, game, puff, open, TPC, tour, player, handicap, par, lead.

The manner in which the analysis and categorization engine generates the category description from the uploaded or otherwise identified documents or information items are described in further detail hereinafter.

As described in greater detail elsewhere in this specification, once the object has been converted into a relevant reduced dimensionality vector, where the primary dimensions of the vector space are seed concepts occurring in that document, the analysis and categorization engine 200 selects a set of these dimensions, or seed concepts, that are or correspond to key concepts that are most representative of the object (FIG. 3, step 410).

After step 410 (See FIG. 3), the representative key concepts for objects under a category are known. As referenced in Table 5, each object and key concept combination has a probability 68 associated with it. The goal is to find out the representative concepts for the category itself by training the system and algorithm or method. This is primarily influenced by two factors. The overall probability 68 contributed by the key concept to the category under which this object belongs (for example, as determined by score ratio R2) and number of objects under a category a given concept occurs (for example, as determined by the object ratio R1). Thus we calculate two ratios for every key concept identified under the category as follows:

1. Object ratio (R1) is total number of objects a key concept occurs under a category over total number of objects under a category.
2. Score ratio (R2) is the total of the probability 68 of the key concept under the category over total of all the probabilities of all the key concepts under the category.

From these two ratios, the composite ratio of key concepts under a given category may be determined. This composite ratio R3 is R1*R2. If this composite ratio R3 falls within the high-bound 29 or low-bound 27 criteria, then this key concept becomes a concept defining the category as well. It should be noted that this training can occur at any time based on user input and can be controlled by the user through an interface.

In a third exemplary embodiment, (3) the analysis and categorization engine 200 creates both category name and description. The user 300 provides training objects 310 pertaining to Golf, such as, for example, US open, British open, Australian open and TPC tour. The system, specifically the analysis and categorization engine 200, generates both the category name 313a and the category description 313b. In the example, the system generates category name 313a and category description 313b as follows.

System generated category name: Golf, woods, irons, US, British, Australian, Shots.

System generated category description: Golf, woods, irons, US, British, Australian, Shots, game, putt, open, TPC, tour, player, handicap, par, lead.

The category building procedure 320 for generating the category name and category description from the uploaded objects is described in greater detail hereinafter. It is noted that the examples are illustrative only, and that a variety of methodologies could be utilized to build categories for use in sorting or analyzing objects. For example, a category may simply consist of a list of words or phrases, it need not have a 'name' or 'description' as utilized in the example.

The generated category name will generally be a subset of category description. The creation of category description was described in the previous section. We choose the top $N_k$ (for example choose $N_k=5$, but any other selected number may be chosen) highest key concepts from the category description as the category name and the selection of concepts for the name and description. Creating a category name is based on number of objects for object name and description creation. Generally, the more the number of objects in the training set, the better the generated concept name and description. The user can group a set of objects and instruct the analysis and classification engine to create category description and category name.

Figure 5:
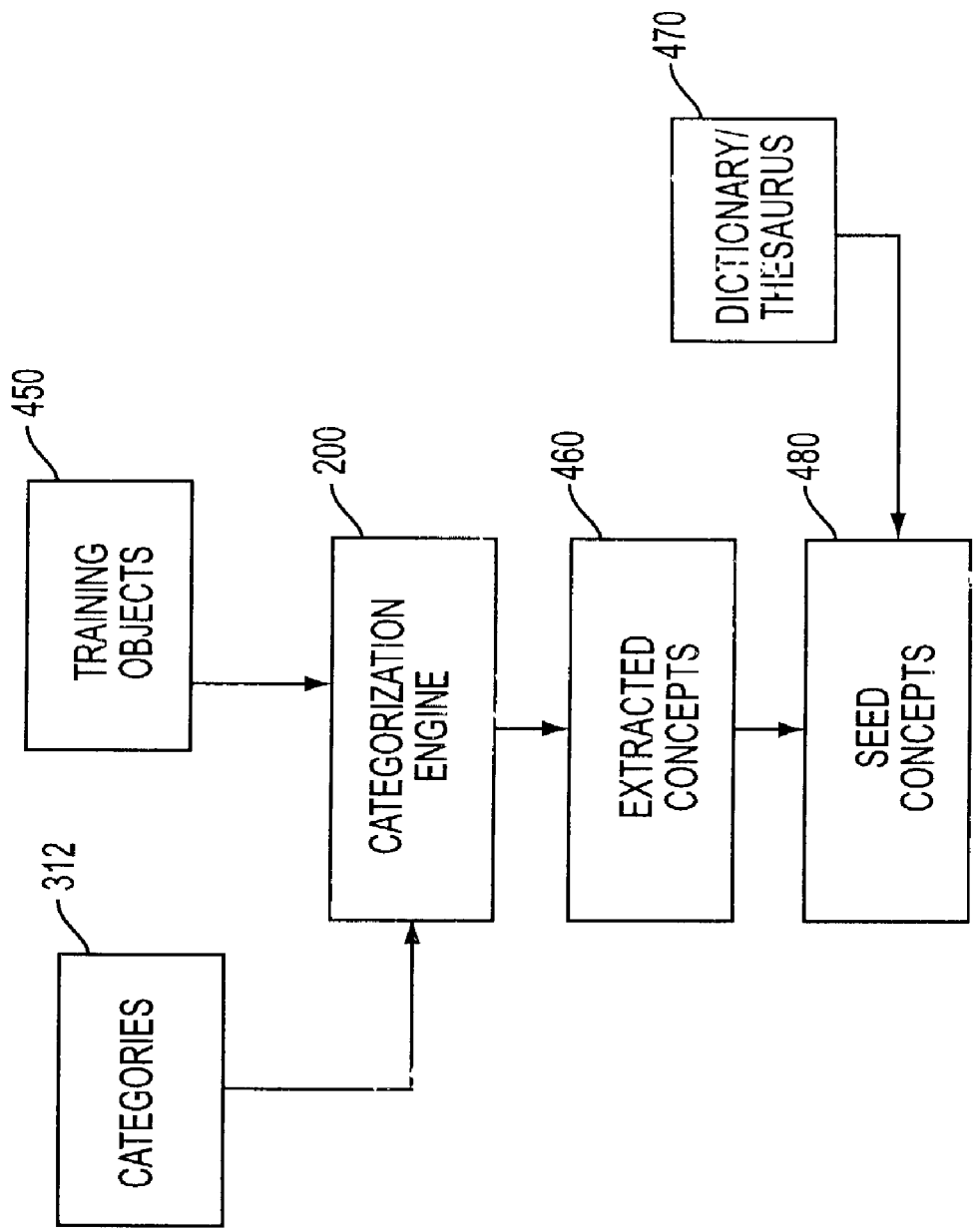
FIG. 5 is an outline of the procedure to generate seed concepts, according to an embodiment of the present invention.

With further reference to the embodiment in FIG. 3, once the categories 312 have been established (note that they may be modified or updated as desired to reflect further intelligence, knowledge, understanding, or data), the analysis and categorization engine 200 captures (step 330) a set of concepts. This capturing process is further depicted in FIG. 5. A concept is usually at least one word and can be a phrase comprising several words. The concepts are preferably given a global concept ID number 42. This number is generated generally by the database engine and is stored as an unique identifier and is preferably between −2,147,483,648 and 2,147,483,647 for reasons of computational and addressing efficiency though there are no procedurally based limits. Other numbering or naming schemes may be utilized to generate global concept IDs. Global concept ID numbers 42 and concept text 44 along with an optional but advantageously provided date/time indicator, such as a timestamp 46, are stored in a concept relational database table as exemplified by Table 2 below. An expiration or inactivation date and time 48 may also optionally be provided. These dates and times assist in assessing relevance and currency of the information which may change over time. All concepts may be stored in such table or tables.

TABLE 2

| concept id (42) | concept text (44) | Created date (46) | Inactivated date (48) |
|---|---|---|---|
| 25 | Innovation | Dec. 15, 1996 | |
| 26 | Discovery | Dec. 16, 1996 | |

It is noted that in one embodiment, the analysis and categorization engine captures or identifies concepts from category names and descriptions during classification, but in one embodiment, the relationships between different words and phrases are created during the thesaurus look-up and are continuously maintained and refined by user interaction.

A seed concept is a concept that will serve as a basis for a concept grouping and is a sub-type of concept. As described, this is either generated by the system when words get extracted (refer word extraction step) or when user provides category name and description. Thus the seed concept id is assigned from the same pool of concept identifiers. Three examples of capturing or generating seed concepts are given below.

In one embodiment, the analysis and categorization engine 200 accepts a set of training objects 450 that define a category. The engine extracts seed concepts based on Category description. In this case, the category description is parsed to get individual words by removing the stop and noise words. The resulting set of words become seed concepts.

In another embodiment, the analysis and categorization engine 200 scans all available documents (such as those stored in a defined directory or a list) and extracts a list of the most frequent keywords and their related words. The analysis and categorization engine 200 utilizes categories 312 and training objects 450 to extract a list of concepts 460.

Seed concepts 480 are refined by a dictionary and thesaurus look-up 470, or according to any other procedure for generating seed concepts. The thesaurus can be augmented by use of additional thesaurus as well. For example, in addition to the English thesaurus, for legal industry we can include a legal thesaurus that will be first accessed for the look-up. This word extraction or generation procedure may, for example, utilize semantic analysis rules or policies and take into account word or phrase occurrence frequency, synonymy, and/or polysemy, grammatical part of speech as well as other optional attributes and/or rules. In some instances, the rules may vary depending upon the number and size of documents or other information items available. An electronic dictionary and thesaurus 470 in the form of a database stored in a memory or storage device are used to generate additional words and/or phrases. Based on the set of extracted words, seed concepts are generated.

The procedure for extraction uses a variation of Latent Semantic Indexing, a well known information retrieval technique. The idea is to extract best possible words out of every document and build a superset of words or phrases and their relationships that would then be able to describe the object collection. The first step in this process is extracting most frequently occurring words from every document. Documents can be sampled in arithmetic or geometric progression and the sampling selection can be based on several criteria such as time, size, author, and the like. The type and frequency of sampling can be modified by the user. The number of words to be extracted from a document is limited by a constant that can be set by the user. Also in order for smaller documents to contribute at the same proportion as the bigger documents, the word extraction process has to be normalized. According to one embodiment, the steps for extracting words from an individual object is as follows:

An assumption is made that every kilobyte of text has approximately W words (in one implementation, W is set to be 150 but a different number may be selected). Then the number of words ($n_w$) that can be extracted from a document is given by the formula $n_w=D_s/W$ where $D_s$ is the document size. The user can control the upper limit of $n_w$ by using upper limits. In the first step, the system and method will extract up to $n_w*10$ frequently occurring words from the document. In the next step, for every word extracted, part of speech will be determined based on grammar look-up. In one embodiment, a proper noun will be given the highest weightage $W(word_i)$, a verb will be given lowest weightage, and a polysemy word will be given medium weightage. (Other weightage rules or policies may alternatively be implemented.) Now the overall weightage by word for every selected word is W(word$_i$)*f(word$_i$) where f(word$_i$) is the number of occurrences of the word$_i$. Now choose n$_w$ n the descending order of W(word$_i$)*f(word$_i$). If word collection n$_w$ from object O$_1$ is called n$_{wo1}$ then the superset, {n$_{wo1}$, n$_{wo2}$, . . . n$_{wom}$} becomes a collection of seed concepts for m objects where {O$_1$ . . . O$_m$} is a collection of individual objects.

In yet another embodiment, a list of words and phrases is generated from a user provided description for a category. For at least some applications, this is a preferred way of generating seed concepts as user-specific information is directly input to the system and algorithm or method. The user can input one or more phrases each within double quotes (or other identifiers) and the engine will capture and store each of them as a multi-word concept. In one embodiment, multi-word concepts are given as much weight or weightage as a proper noun for part-of-speech.

Figure 6:
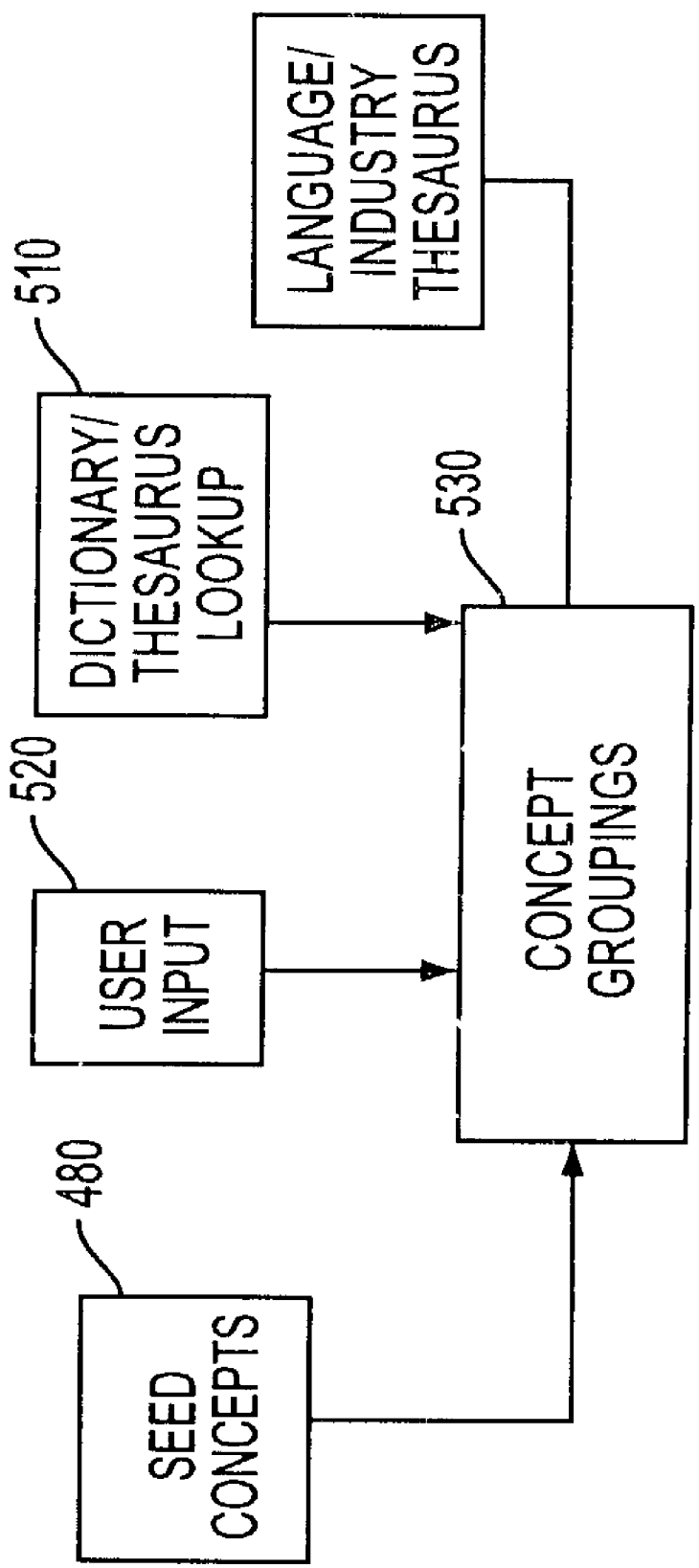
FIG. 6 is an outline of the procedure to generate concept groupings, according to an embodiment of the present invention.

Once seed concepts 480 have been generated (see FIG. 5), they are extrapolated using a seed concept extrapolation procedure into concept groupings 530 as depicted in FIG. 6. Seed concepts 480 are augmented utilizing one or both of a dictionary/thesaurus look-up 510 and user-entered words 520 to form concept groupings 530 which are a set of related concepts. The concepts in the concept groupings are related in predetermined, structured ways and are stored together, for example, in a relational database table that demonstrates their relatedness. The analysis and categorization engine advantageously extracts not only words from the dictionary or thesaurus, but the relationship between the words and the seed concept and optionally but advantageously the part of speech as well.

Figure 7:
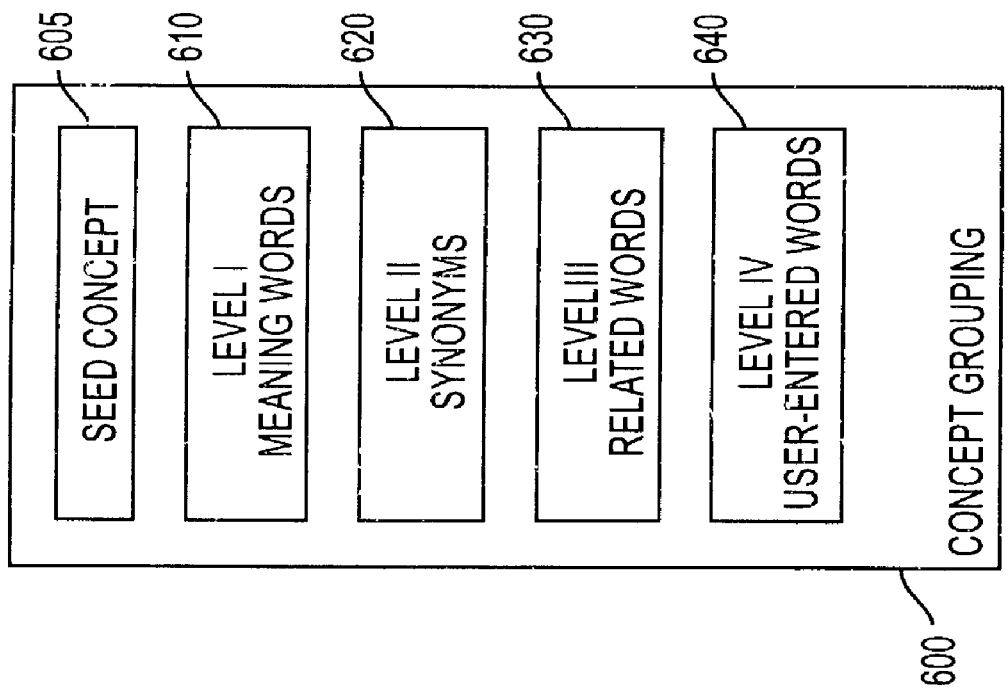
FIG. 7 is an example of a concept grouping, according to an embodiment of the present invention.

FIG. 7 illustrates an exemplary embodiment of a concept grouping 600 that employs four levels where each level denotes a conceptual manner by which the concepts are related—meaning words 610, synonyms 620, related words 630, and user-entered words 640, although more than or fewer than four levels could be used. In the FIG. 7 embodiment, the seed concept is 'young', and meaning words (Level I) 610 determined through a dictionary look-up, reference to other meaning sources, or the like include 'youthful', 'new', and 'offspring'. Synonyms (Level II) 620 determined through a thesaurus lookup or other sources, include 'adolescence', 'immature', and 'childish'. Related words (Level III) 630 determined in a thesaurus lookup or reference to other sources include 'youth.' Finally, the user has entered the phrase '18 to 24 years old' as a user-entered word or phrase (Level IV) 640. By incorporating user-entered words and phrases into the concept groupings, the analysis and categorization engine 200 advantageously goes beyond thesaurus and dictionary terms to capture meaning specific to a user or an industry—for example, the term 'delinquent' may refer to unlawful activity in typical English language usage while it refers to overdue accounts in the consumer credit industry. The concept groupings allow this specialized meaning to be captured. A user can deactivate any of the words or phrases included in the concept grouping as well as elect not to use any of the available levels.

Concept groupings 600 are advantageously stored in a seed relationship relational database table as exemplified by Table 3. Since concept groupings are generally user-specific, the user ID 56 is stored along with a global seed concept ID 42, a related concept id 50, and the type of relationship 52. A status flag or indicator 54 also may be stored, allowing the user to activate or deactivate specific relationships. Providing this relational database table advantageously allows the system to utilize these concept groupings for multiple users while maintaining the ability of individual users to modify and customize the groupings.

It should be noted that the seed concepts themselves can be interrelated. For example, there may be two seed concepts "bug" and "insect" and they have the same meaning. The engine scans the database looking for relationships among individual seed concepts. This is done by taking an individual seed concept and looking for the existence of related concepts in Table 2. The relationship is established again using thesaurus look-up. For example, in this case, bug has meaning of insect and when insect appears in Table 2, a concept grouping entry will be created by linking "bug" at level 1 with "insect" in Table 3. Thus concepts having similar meanings, synonyms, inflections and related words would be linked.

TABLE 3

| User ID or User number (56) | Global concept id (42) | Related Global concept id (50) | Type of relationship (52) | Status (54) |
|---|---|---|---|---|
| 15 | 25 | 26 | Related word | Active |
| 16 | 25 | 26 | User-defined | Active |
| . . . | . . . | . . . | . . . | . . . |

Figure 8:
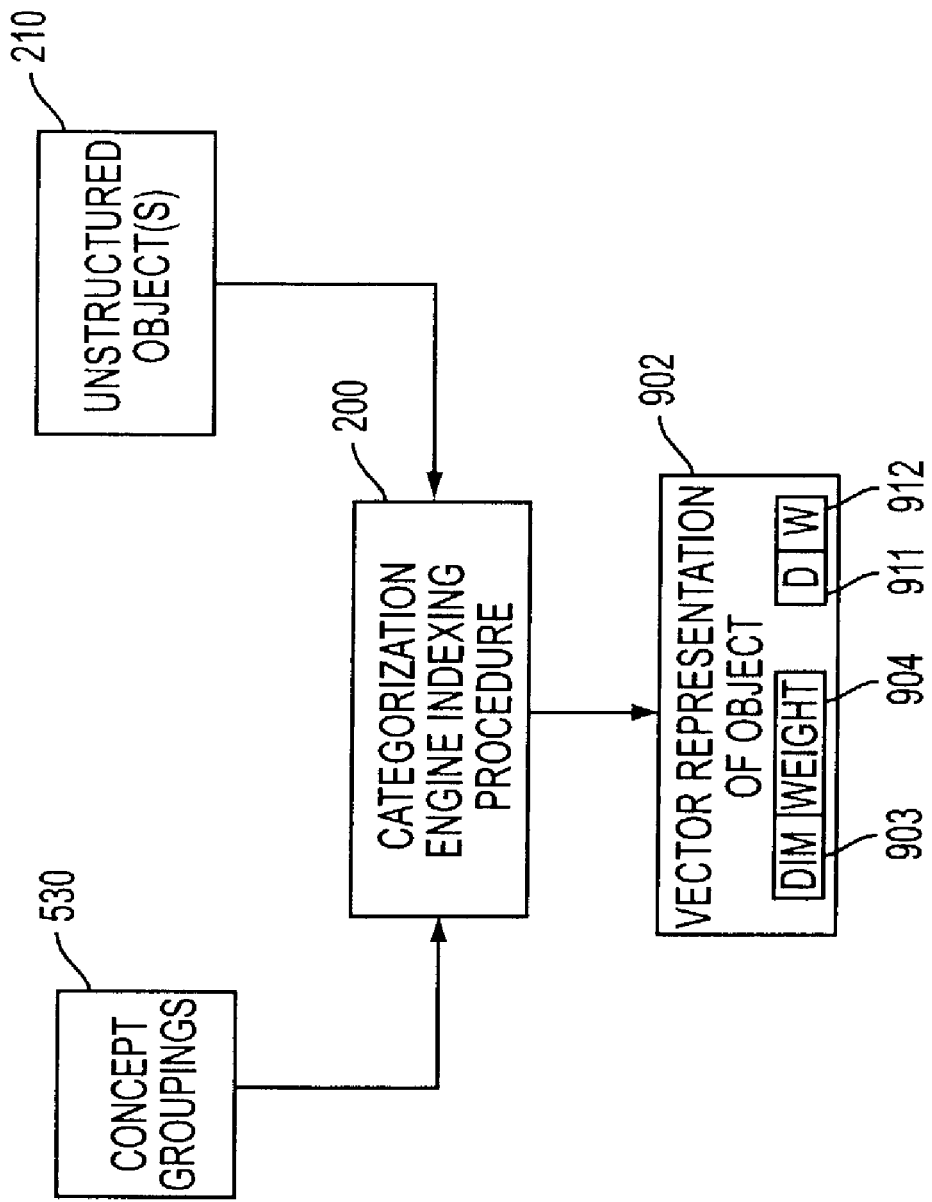
FIG. 8 illustrates an example of a vector representation of an object according to an embodiment of the present invention.

In the embodiment illustrated in FIG. 8, the analysis and categorization engine 200 utilizes the concept groupings 530 to generate a vector representation 902 of each unstructured object 212. Generating vector representations of objects is well known in the art. In conventional systems and methods, a vector representation is used in which objects are represented as vectors of the descriptors that are employed for information retrieval (see, for example, Salton G, McGill M J 1983: Introduction to Modern Information Retrieval, McGraw-Hill New York incorporated herein by reference). The vector representation 902 comprises a number of dimensions such as 903, 911 each with a corresponding weight 904, 912. In the present invention, the descriptors utilized as vector dimensions are seed concepts and could be as many as the number of words in the body of the text. In contrast to conventional systems, the present invention utilizes the concept groupings—which optionally contain user-entered phrases—to reduce the dimensionality of the vector representation. By combining the user input before building the vectored representation, the inventive technique embodies the knowledge of user interaction directly into the vectored representation. This helps enhance the accuracy of vectored representation of an object from the user view point. It should also be noted that the engine allows the flexibility for multiple users and views to build their own vectored representation of the objects available for that user and/or view. This results in continuous to an object in the way that particular user or view is looking for. Generating this vector representation corresponds to the indexing procedure 390 of FIG. 3.

Figure 9:
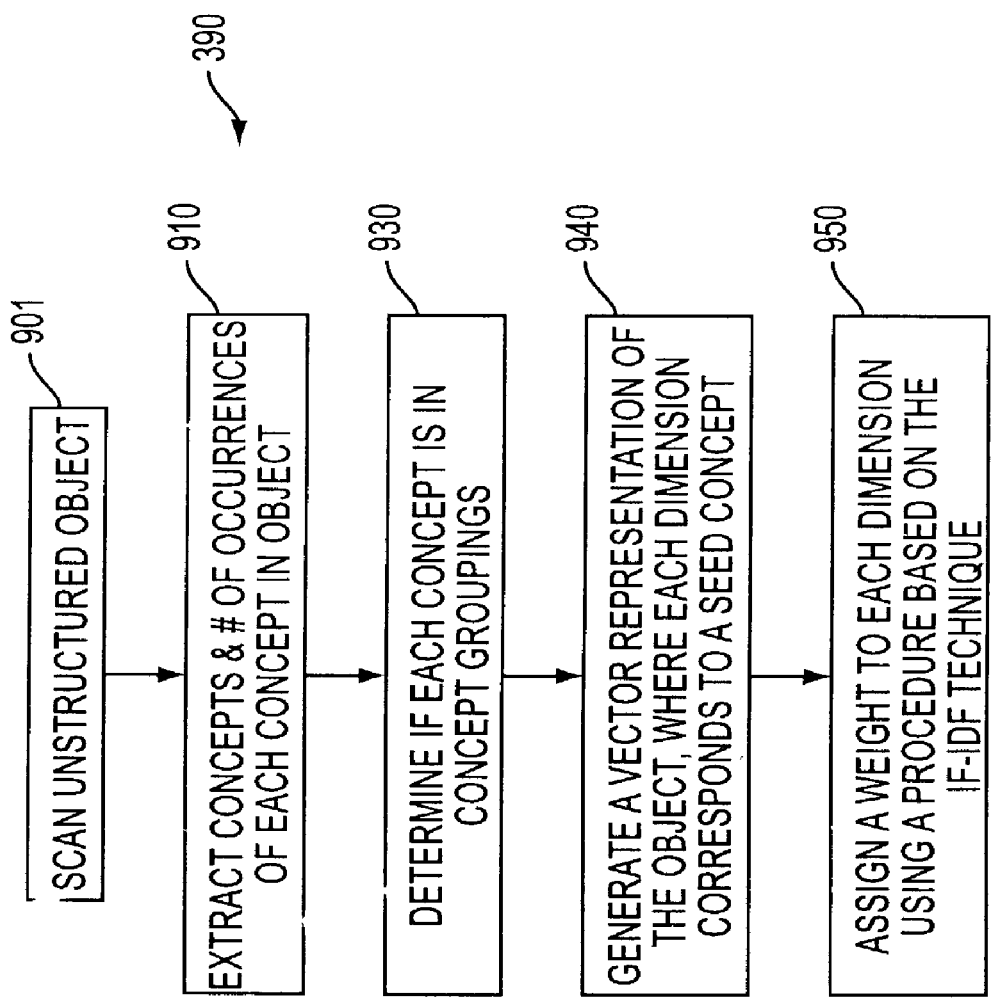
FIG. 9 is an outline of the procedure to index an unstructured object, according an embodiment of the present invention.

The indexing procedure 390 is described further in FIG. 9. The analysis and categorization engine 200 scans an unstructured object (step 901) and extracts concepts and the number of occurrences, or hits, of each concept within the object (step 910). The engine 200 desirably neglects or ignores stop and noise words. The words such as "a", "the", and "and" are examples of common noise words that are ignored in search strategies. Stop words are words that need not be processed and are not important for the user or the view. The user has the flexibility to set any word to be a stop word and allow the engine to skip processing. The analysis and categorization engine 200 advantageously determines if each extracted concept is in the known concept groupings (step 930) and generates a vector representation of the object where each dimension corresponds to a seed concept (step 940). The known concept groupings utilized may be different for different users or groups for the same unstructured object. Advantageously but optionally, the analysis and categorization engine 200 assigns a weight to each vector dimension so that more important concepts may be given greater consideration (step 950). For example, weight may be assigned based on the frequency of occurrence of that concept in the object. A variation of the Tf-Idf technique may be applied for this weighting. Techniques other than Tf-Idf may instead be used, but a Tf-Idf based approach has been found to perform well with the system and method described here.

The total number of occurrences of a concept within an object or some measure or metric derived from such total is stored in a cross-reference relational database table exemplified by Table 4 below. This table preferably includes the global object ID 56 (as indexing is desirably independent of user), the concept ID 50, number of hits 58, and location of the concept 60 within the object. Additionally, an index start time 62 and cross-reference time 64 are included to keep a block of cross-references for an object together and to enable later search capabilities. Advantageously, a cross-reference entry is made for each concept.

TABLE 4

| Object id (56) | Concept id (50) | Cross reference time stamp (64) | Cross reference type (60) | Index start time (62) | Total # of hits (58) |
|---|---|---|---|---|---|
| 500 | 26 | 3/5/01 2:00 PM | Title | 3/5/01 1:59 PM | 6 |
| 500 | 25 | 3/5/01 2:01 PM | Body | 3/5/01 1:59 PM | 3 |
| ... | ... | ... | ... | ... | ... |

The Term-Frequency Inverse Document Frequency or Tf-Idf technique is well-known in the art, and is a technique which represents an object as a vector of weighted terms. TF denotes term-frequency and IDF denotes inverse-document-frequency. Terms that appear frequently in one document, but rarely in other documents are more likely to be relevant to the topic of the document. Therefore, the TF-IDF weight of a term in one document is the product of its term-frequency (TF) and the inverse of its document frequency (IDF). In addition the weighted term vectors are used and are normalized to unit length to prevent lengthier documents from having a better chance of retrieval due only or primarily to their length. A standard information retrieval weighting mechanism is:

$$w = Hc * Tf * idfk$$

where w is a weight of a word or phrase in a document, Hc is a header constant, Tf is a frequency of the word or phrase in the current document and idfk is defined as:

$$idfk = \log(N/dfk)$$

where N is the total number of documents already retrieved by the system, and dfk is the document frequency of any given term, for example, the k-th term. The header constant is utilized in the present invention differently from its standard usage in that the invention system and method use the term to reflect the position of the concept in the object and its part of speech.

In addition, the inventive system and method differs from the standard Tf-Idf technique in that it looks beyond synonyms, related words, and definition words by using the concept groupings that have already been built and which are described in greater detail elsewhere in this description. The concept groupings advantageously have four levels, spanning synonyms (Level I), related words (Level II), meaning words (Level III), and user specific input (Level IV) that are utilized to reduce the dimensionality of the vector representation. Embodiments of the system and method may provide for only a subset of these levels or may provide additional levels. Reduction of the vector dimensionality is an advantage of the invention for several reasons, including but not limited to providing a more accurate and user-specific representation of the object.

Once the object has been converted into a relevant reduced dimensionality vector, where the primary dimensions of the vector space are seed concepts occurring in that document, the analysis and categorization engine 200 selects a set of these dimensions, or seed concepts, that are or correspond to key concepts that are most representative of the object (FIG. 3, step 410). All the components of the reduced dimensionality vector itself are advantageously stored in a single table or data structure, such as in Table 4. In order to deduce dimensions of the stored vector, for every concept id 42 for a given object 56, look up for the corresponding global concept id 42 in Table 3 by setting related concept id 50 to concept id 50 in Table 3. Now combine all of the concept ids 42 occurring under the global concept id and sum up the corresponding total number of hits 58. The ordinal of global concept ids 42 gives the dimension and the sum of total number of hits 58 by global concept id gives the weightage for that global concept id 42.

Assuming the number of words/phrases in a given object as a large integer on an average, according to the central limit theorem, the total number of occurrences of concepts derived from the object can be approximated to standard normal distribution.

Figure 10:
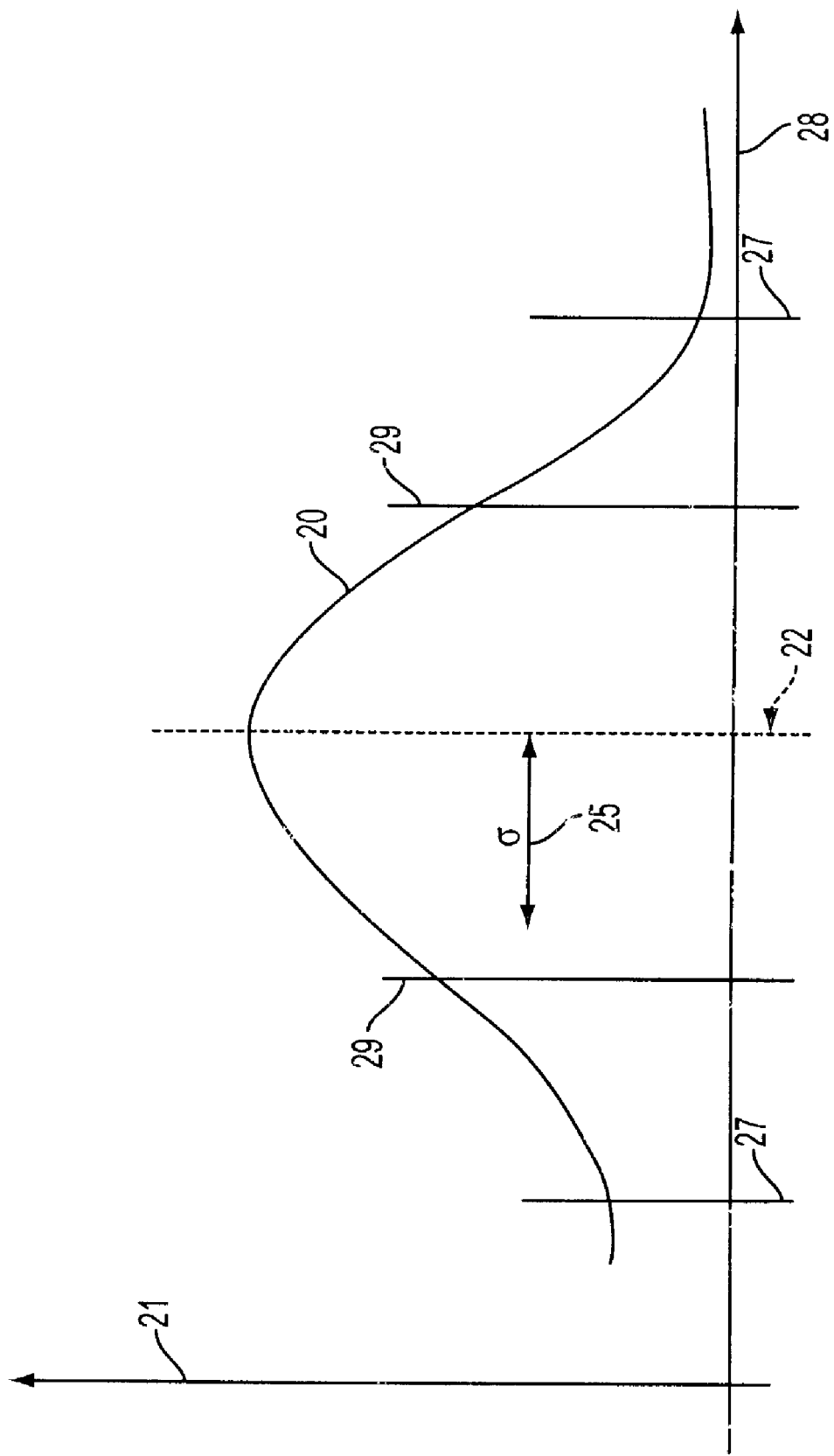
FIG. 10 is a Gaussian distribution curve and decision boundaries created for an unstructured object, according to an embodiment of the present invention.

As shown in FIG. 10, a standard normal (Gaussian) distribution curve 20 is specified for each object. Curves or functions other than the Gaussian curve or function may be used but the standard normal Gaussian distribution curve is preferred. The Gaussian or normal distribution is characterized by two parameters: the mean ($\mu$) 22, and the standard deviation ($\sigma$) 25. Thus, a specific curve for each object is specified by determining a mean weight and a standard deviation of weights, and the Gaussian curve built according to the expression $Z=(X-\mu)/\sigma$ where Z is the probability along axis 21 and X is the weight, along axis 28. A probability Z can be assigned to each concept, based on the weight X of that concept. Those workers have ordinary skill in the art in light of the description provided here will appreciate that other statistical functions or characterization could alternately be employed. It is observed that normal distribution can be positively or negatively skewed and can be leptokurtic or platykurtic.

Key concepts are seed concepts that are selected to represent the object. In a symmetrical normal distribution, Key concepts have a weight closer to the mean 22 than some distribution lower limit (or low-bound) 27, and further from the mean 22 than some upper limit (or high-bound) 29. A concept whose weight falls further from the mean than low-bound is deemed to make an insignificant contribution to the concept of an object. A concept whose weight falls closer to the mean than high-bound occurs very frequently and thus contributes little to inherent meaning of the object. These criteria are broadly based on Claude Shannon's information theory, which states in general terms that the more frequently an information pattern occurs, the less its intrinsic value. Low- and high-limits can be modified by the user, and are advantageously expressed as some multiple of the standard deviation.

Key concepts are advantageously stored as structured information in an open architecture format, such as a relational database table. As the same object can be used by multiple users in different ways, in order to provide a way for object to be classified in a user specific way, objects are given a user object ID 66 or identification. This ensures that the same object can be categorized in multiple ways without duplicating the object and its contents every time it needs to be categorized for a user and for a view (a view may be defined by the user or the system, but may typically be a logical grouping of objects as specified by the user). User object IDs 66 are preferably a number between 0 and 2,147,483,647 but may be in different ranges. Utilizing a user object ID 66, as opposed to a global object ID 30 in this captured concept relational database table allows different users to store different vector representations of the same object. The key concept ID 42 for each key concept identified for the object is stored. The probability 68 associated with each key concept id 42, as determined from the Gaussian distribution, is stored. The probability 68 is preferably stored as a floating point number between 0 and 1 but may be scaled to other number-ranges, formats, or representations, such as an integer representation between 0 and 9,999,999,999 or any other convenient range providing sufficient resolution or precision for the task or query. The rank 70 of each key concept is stored. A rank of one preferably indicates that key concept had the highest probability of representing that object, while a rank of 3, for example, indicates the key concept had a lower priority than two other concepts, and so on. An exemplary embodiment of such a captured concepts relational database table is shown as Table 5.

TABLE 5

| User object id (66) | Key concept id (42) | Score (68) Probability | rank (70) |
|---|---|---|---|
| 15 | 25 | 0.66 | 2 |
| 15 | 26 | 0.95 | 1 |

In one embodiment, a conditional probabilistic method is advantageously used for classification to determine whether an object belongs to a given category. Referring back to FIG. 3, a score for each category is computed for (step 420) each object by processing the probabilities of all concepts in the object for that category. Even though low-bound 27 and high-bound can be any real number from 0 to 1 (or any other defined range), by setting the low-bound 27 to $[\mu-2*\sigma]$ (where $\mu$ is the mean and a the standard deviation) and high-bound 29 to $[\mu+2*\sigma]$, we can capture many representative concepts for an object. This may be necessary or desirable for objects whose contents span several areas such as magazine articles. Normal distribution thus helps us remove certain high occurrence and low occurrence concepts from consideration. In such cases, the precision of classification can decrease dramatically if we have the same concept or phrase defining multiple categories. As an example, if the word "Woods" occurs in "Tiger Woods the Golfer", "Woods Hole Oceanarium" and "Bretton Woods Ski Resort", then the word "Woods" itself does not mean as much as the context under which it occurs. Thus the importance given to Woods should be reduced in the context of surrounding concepts and description. On the other hand, if there was a document about Tiger Woods where Woods occurs frequently with minimal mention of Golf, it should still be classified as "Tiger Woods the Golfer". Otherwise recall will decrease. Thus in this case importance given to Woods should be increased despite the fact that Woods occurs in other categories as well. In order to address both of these situations, we define two ratios namely:

1. Inverted category ratio ($R_i$): As the number of categories in which the concept occurs (say for example, $N_{ci}$) increases, the importance of the concept contribution to the overall classification decreases. If there are $N_c$ distinct categories, then we define inverted category ratio as: $\exp(-N_{ci}/N_c)$ where exp stands for exponentiation. The ratio is exponential as weightage is not zero when the concept occurs in all the categories. It should be noted that this ratio will be the largest when $N_{ci} \ll N_c$ (approaches 1) and will be the smallest when $N_{ci}=N_c$ ($\exp(-1)$) that is when the given concept occurs in all the categories. This ratio will always be greater than or equal to 0.37 approximately and less than or equal to one.
2. Concept presence ratio ($R_c$): This is the ratio of number of times a concept occurs in an object ($n_c$) over the total of all the concepts that occur in an object ($n_{tc}$). This ratio provides the relative importance of a concept in an object. This is directly proportional to the concept occurrence in an object. This ratio will always be greater than or equal to zero and less than or equal to one.

The combined ratio $R=R_i*R_c$ is multiplied with object scores (the probability of key concept) 68 for final classification to categories. As individual component of the multiple is less than or equal to one, the combined score will always be greater than or equal to zero and less than or equal to one. In one embodiment, the processing of probabilities is an average. For each category, the combined score R of all key concepts appearing in the category and the object are summed and the total is divided by the total number of key concepts appearing in the object ($R_s$). In order to give equal weightage to categories with less descriptive concepts vis-à-vis more descriptive concepts, we define category normalization ratio ($R_n$). This category normalization ratio is defined as the ratio between the total number of concepts that occur in both the category and the object over the total number of concepts in the category. The final object score 74 is then $R_s*R_n$. Note that the object score according to usage here will always be greater than or equal to zero and less than or equal to one. Thus it can be represented as a percentage for convenience. Other mathematical objects or processes may be used to assign a score to the categories, particularly modification to a straight averaging.

The use of standard normal distribution to capture central theme or idea helps in the manner described as follows:

1. It allows us to capture the central theme or idea of the document as opposed to capturing all the concepts which can be a very large number and may not concisely represent object concept or theme. By controlling the low-bound 27 and/or upper-bound 29, a user can influence the accuracy of capturing concepts. Thus repeated occurrence of certain concepts can be eliminated for object concept or theme consideration by setting the upper-bound 29 to a number less than 1, say 0.995. Similarly a concept that does not seem to represent the object with a low score, can be eliminated for consideration of object concept or theme by setting the low-bound 27 to a number greater than zero, say 0.16.

2. It allows for more accurate analysis and categorization. We define two more terms generally known in information retrieval techniques namely "precision" and "recall". Recall measures the percentage of relevant texts that were correctly classified as relevant by the algorithm. Precision measures the percentage of texts classified as relevant that actually are relevant. By only choosing to match the central theme or idea of the document with the targeted categories, it can improve precision and recall. Precision is improved as objects classified under a certain category will be relevant to the category. On the other hand, only those objects that are considered to be match for the concepts defining the category will be chosen thereby improving recall.

Objects are assigned to categories having a score greater than a threshold value of 25% (step 430). The threshold value is a percentage and can have a value between 0 and 100. It is determined or set by the user based on several characteristics of the corpus of objects. These characteristics include features such as whether the corpus has objects with similar contents, whether a single object can have multiple themes (for example, as in a news feed), and the like characteristics. In general, it is observed that for object with multiple themes, lower threshold value such as 25% (or equivalent fraction) would be needed as opposed to object with single theme for which threshold can be higher such as 40%. As more objects are input to the engine, the more accurate the engine becomes and thus large volumes of objects input implies a lower threshold value as well. For example, threshold value in the range of 25% to 35% may typically be encountered, but are not limited to this range. More particularly, the threshold value range may have any upper and lower bound and be any range It is noted that each user may have different categories, concepts, and/or concept groupings, as is true also for groups or organizations. Thus, the category to which an object is assigned may be different for different users (or groups or organizations).

Output from the analysis and categorization engine is advantageously stored in a user object relational database table, such as, for example, a relational database table illustrated in Table 6. Table 6 includes the user ID 56, user object ID 66, and global object ID 30 as well as user object hierarchy pointer 72. The user object hierarchy pointers 72 indicate the parent, or category, ID to which the object belongs and the relative location of the object pointer which indicates an ordering of objects as provided to the analysis and categorization engine. The score 74 for the object under that category is also stored. A status 76 is also provided to enable the display of the objects in a manner desirable to a user, for example, the categories may appear in a user interface as a folder and these folders may appear open or shut. Status 76 may also indicate that the object has been deleted or is active. One object can belong to more than one category, and thus can have more than one entry in this table.

The above remarks have focused on the analysis and categorization engine 200 provided by the present invention to deduce the theme, or meaning of unstructured information and store output as structured information 230 in an open architecture format, we now turn to aspects of the present invention that further provide interface tools for viewing and analyzing unstructured information based on the categorization data collected and stored via the analysis and categorization engine. These tools enable intelligent views of unstructured information, the ability to view trends in a group of unstructured objects, and the ability to execute object concept based searches.

Figure 11:
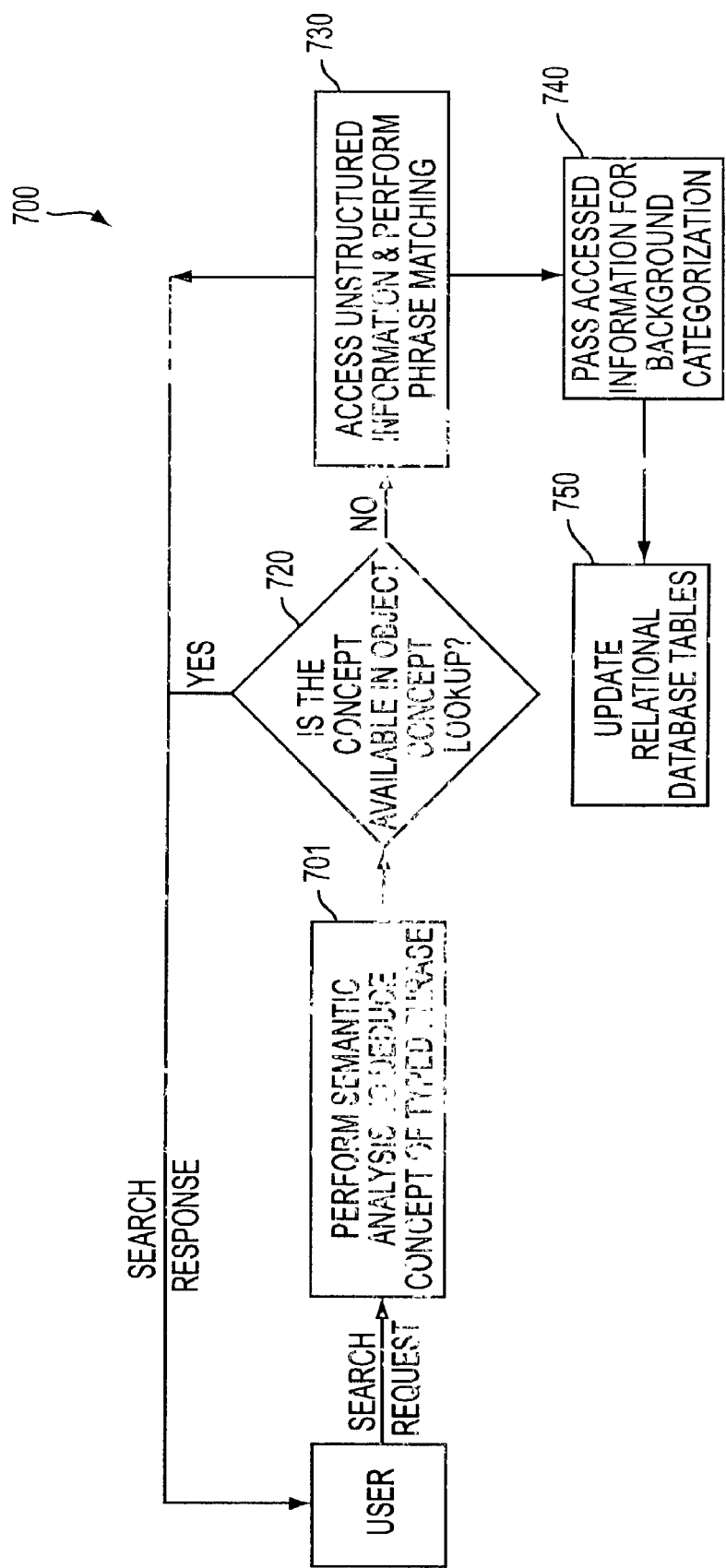
FIG. 11 is an outline of the procedure performed by the object concept based search engine, according to an embodiment of the present invention.

The inventive system and method advantageously provide and utilize an object concept based search utilizing the structured information 230 generated by the analysis and categorization engine 200. An embodiment of this object concept based search process 700 is outlined in FIG. 11. First, the search engine parses the user-entered search text to capture a seed concept or seed concepts of the entered text (step 701). The search engine then determines whether at least one of the captured concepts are available as a key concepts associated with an object in the relational database tables (step 720). The process is repeated for all seed concepts entered. Then, within the resulting list of objects, the search engine then determines if all the seed concepts and their user customizations exist, even the ones that have not been picked up as key concepts. The resulting object list gets narrowed down to accommodate the existence of all entered seed concepts with their special user customizations. Objects whose concepts match will then be returned to the user.

The objects returned as results for the object concept based search are then scored according to the following algorithm. The scores for the individual key concepts that contributed to the search are averaged for each object returned. If the search was performed by using a combination of key concepts and seed concepts, the number of hits for the seed concepts are then divided by the total number of hits picked up for all seed concepts in the document to determine how much the seed concept actually contributed to the concept of the document. This figure is then added and averaged with the average score for the key concepts to arrive at a relevancy score for the object as pertains to this particular search.

If the captured concept is not contained in the relational database tables, the search engine optionally performs a keyword search and phrase matching, directly accessing the unstructured information (step 730). In addition, the search text is passed to the analysis and categorization engine (step 740). The engine can re-capture the object concepts and update the relational database tables (step 750).

The process then comprises capturing search text 220, and parsing the search text as individual words and phrases. The words within double quotes are considered as phrases, even though this definition of phrase can vary. It then uses the

TABLE 6

| User id/ Group id (56) | User object id (66) | Object_id (30) | User object hierarchy pointers (level, parent id, relative location of the object pointer) (72) | Object status (active, deleted, how to display - shut or open) (76) | Object score (74) |
|---|---|---|---|---|---|
| 15 | 200 | 500 | (3, 490, 150) | Active | −76.5 |
| 16 | 201 | 501 | (4, 20, 200) | Deleted | 26.2 | seed concepts extrapolation procedure to produce concept groupings 530 as depicted in FIG. 6. Based on the additional concepts, the engine will now refine the already generated and stored components of the reduced dimensionality vectors in Table 4. If the additional concept exists in an object, it will be added as a new entry in the data structure represented here as Table 4. The objects whose reduced dimensionality vectors have been modified in Table 4 will now go through steps 400, 410. Table 5 would be modified because of the newly added seed concepts and/or concepts. Specifically, Key Concept id 42 would be modified to reflect newly added information.

As any user search continuously refines Table 4 and Table 5, the captured object concepts continue to get more accurate and thus can anticipate user search needs. Thus over time, the system can meet the user concept search needs with accuracy in step 720. The next time a user enters a similar phrase, the concepts look-up would contain the relevant information.

A graphical user interface advantageously provided by the inventive system provides a dynamic matrix view of concepts and their occurrence within unstructured objects. Concepts (42) are advantageously displayed versus object description 34 in a matrix, or spreadsheet, format. This assists a user in quickly determining an object or objects of interest. A user can choose concepts 42 to add or remove from this view and can compare concepts within the view. The provided view is personalized, that is, the view provided for a first user viewing a first set of unstructured objects user id and can have all the functionalities associated for the user. Each of the multiple views accessing the same object have their user object identifiers that link an object id to a specific user/view. Thus it is possible in this embodiment or design for multiple user or views to have access to the same object. As captured and refined concepts and categories can vary by user and/or view, it is possible for the same user object to be categorized and analyzed differently in every view.

The user/view has to specify through an interface what categories need to be shared with other users/views. This has to be done for all the categories that need to be shared once. Now, as soon as an object is classified under an user or view, the category under which the object is classified is examined to see if this would be shared and the targeted user or view for sharing, Then the user object will be reclassified for the targeted user or view. If the object (pointed to by the user object id) already exists under a category, then the object will not be classified again. If the category (or categories) under which a user object gets classified for a targeted user or view is shared, then the object will be shared based on the targeted user or view sharing setup. This process thus creates a dynamic flow of objects in the network of users or views without duplication of objects as only user object ids that point to the object id get created every time.

The use of views are advantageously more than just sharing. Views facilitate multidimensional analysis of unstructured information. For example, we can share a view on Golf (View I) to another view created on Tiger Woods (View II). Now the contents of View II, will have Golf and Tiger Woods. We can take that information and share it with another view (View III) on Vijay Singh. Then that view will have information only on Golf, Tiger Woods, and Vijay Singh. We can share the contents of View III and share with View IV on Chip Shots. Then the contents of View IV would be Golf, Tiger Woods, Vijay Singh and Chip Shots. This way we can drill down on unstructured data along multiple dimensions. Once the views are setup, the information will continue to flow and be updated.

It will be appreciated that the algorithms, procedures, and methods described herein may be implemented as computer program software and/or firmware to be executed on a general of special purpose computer or information appliance having a processor for executing instructions and memory associated with the processor for storing data and instructions. The computer program may be stored on a tangible media such as a magnetic storage device, optical storage device, or other tangible media customarily used to store data and/or computer programs. It will also be appreciated that the computer program product may be stored at one location and transmitted electronically, such as over the Internet or other network of connected computers, for receipt and storage at another location.

The inventive system and method further provide a data structure, such as a data structure defined in electronic memory of a computer or stored in other tangible media. Embodiments of the data structures have been described with reference to the tables herein above.

The inventive system and method also provide a business or operating model or method for concept-based dynamic analysis of unstructured information. Such operating model or method may for example provide access to a server that implements the inventive techniques on a pay-per-usage, pay-per-information item, pay-per-time, or other quantity or time basis. The inventive method may also or alternatively be provided in an application service provider context.

Workers skilled in the art will appreciate that, in light of the description, a variety of interfaces can be provided for a user to view, and understand the meaning of, unstructured objects based on the structured information generated by the analysis and categorization engine.

Although several embodiments of the invention have been described, it should be understood that the invention is not intended to be limited to the specifics of these embodiments. For example, specific information extracted by the analysis and categorization engine could be stored at different stages in relational database tables having a slightly different organization. Further, other data storing mechanisms could be utilized for making available the output of the analysis and categorization engine's analysis.

We claim:

1. A system for accessing and analyzing unstructured objects, where the system provides structured information through which a user can access the unstructured objects, the structured information including a set of concepts where each concept comprises at least one word, the system comprising:
 a first storage medium storing at least one unstructured object;
 a second storage medium storing an analysis and categorization engine procedure that, when executed, accesses the unstructured objects and generates structured information about the objects;
 a third storage medium storing the structured information in a form of at least one relational database data structure, wherein the at least one relational database data structure comprises a relational database table having a global seed concept ID field, a seed concept text field, and a created date field; and
 a computer processor accessible to the user, having access to the structured information.

2. A system for accessing and analyzing unstructured objects, where the system provides structured information through which a user can access the unstructured objects, the structured information including a set of concepts where each concept comprises at least one word, the system comprising:
- a first storage medium storing at least one unstructured object;
- a second storage medium storing an analysis and categorization engine procedure that, when executed, accesses the unstructured objects and generates structured information about the objects;
- a third storage medium storing the structured information in a form of at least one relational database data structure, wherein the at least one relational database data structure comprises a relational database table having a user ID field, a global seed concept ID field, a related concept ID field, a type of relationship field, and a status field; and
- a computer processor accessible to the user, having access to the structured information.

3. A system for accessing and analyzing unstructured objects, where the system provides structured information through which a user can access the unstructured objects, the structured information including a set of concepts where each concept comprises at least one word, the system comprising:
- a first storage medium storing at least one unstructured object;
- a second storage medium storing an analysis and categorization engine procedure that, when executed, accesses the unstructured objects and generates structured information about the objects;
- a third storage medium storing the structured information in a form of at least one relational database data structure, wherein the at least one relational database data structure comprises a relational database table having an object ID field, a concept ID field, a cross-reference time stamp field, a cross-reference type field, an index start time field, and a total hits field; and
- a computer processor accessible to the user, having access to the structured information.

4. A system for accessing and analyzing unstructured objects, where the system provides structured information through which a user can access the unstructured objects, the structured information including a set of concepts where each concept comprises at least one word, the system comprising:
- a first storage medium storing at least one unstructured object;
- a second storage medium storing an analysis and categorization engine procedure that, when executed, accesses the unstructured objects and generates structured information about the objects;
- a third storage medium storing the structured information in a form of at least one relational database data structure, wherein the at least one relational database data structure comprises a relational database table having a user object id field, a key concept id field, a probability field, and a rank field; and
- a computer processor accessible to the user, having access to the structured information.

5. A system for accessing and analyzing unstructured objects, where the system provides structured information through which a user can access the unstructured objects, the structured information including a set of concepts where each concept comprises at least one word, the system comprising:
- a first storage medium storing at least one unstructured object;
- a second storage medium storing an analysis and categorization engine procedure that, when executed, accesses the unstructured objects and generates structured information about the objects;
- a third storage medium storing the structured information in a form of at least one relational database data structure, wherein the at least one relational database data structure comprises a relational database table having a user ID field, a user object ID field, an object ID field, a user object hierarchy pointer field, and object status field, and an object score field; and
- a computer processor accessible to the user, having access to the structured information.

6. A relational database structure, embodied on a computer-readable medium, for storing structured information about an object, the database structure comprising:
- at least one relational database table having a global seed concept ID field and a seed concept text field, and a created date field whereby the structured information about the object is made accessible to a user.

7. The relational database data structure of claim 6, wherein the at least one relational database data structure comprises a relational database table having a user ID field, a global seed concept ID field, a related concept ID field, a type of relationship field, and a status field.

8. The relational database structure of claim 6, wherein the at least one relational database data structure comprises a relational database table having an object ID field, a concept ID field, a cross-reference time stamp field, a cross-reference type field, an index start time field, and a total hits field.

9. The relational database structure of claim 6, wherein the at least one relational database data structure comprises a relational database table having a user object id field, a key concept id field, a probability field, and a rank field.

10. The relational database data structure of claim 6, wherein the at least one relational database data structure comprises a relational database table having a user ID field, a user object ID field, an object ID field, a user object hierarchy pointer field, and object status field, and an object score field.

11. A computer-based method for automatically assigning at least one key concept to represent an unstructured object, comprising:
- automatically selecting at least one concept from the unstructured object without requiring user input to identify the concept;
- expanding each selected concept into at least one concept grouping, wherein a concept grouping contains elements consisting of a seed concept and at least one related concept;
- scoring each concept grouping to indicate the relevance of the concept grouping to the unstructured object; and
- applying probabilistic analysis to the scores of the concept groupings to identify at least one relevant concept grouping, wherein for each relevant concept grouping, the seed concept of the relevant concept grouping is a key concept of the unstructured object, whereby at least one key concept is assigned to represent the unstructured object.

12. The method of claim 11, wherein the selecting step comprises:
- filtering undesired elements from the unstructured object to produce a filtered object; and
- selecting at least one concept from the filtered object.

13. The method of claim 12, wherein the filtering step comprises:
removing predetermined characters, words, and phrases from the unstructured object to produce a filtered object.

14. The method of claim 11, wherein the expanding step comprises:
selecting at least one concept grouping from a set of preexisting concept groupings wherein a selected concept matches an element of the concept grouping.

15. The method of claim 11, wherein the expanding step comprises:
using preexisting information to create at least one concept grouping wherein a selected concept is an element of the concept grouping.

16. The method of claim 11, wherein the expanding step comprises:
using preexisting information to create at least one concept grouping wherein a selected concept is an element of the concept grouping and the preexisting information is selected from the group consisting of: meaning words, synonyms, related words, and user-entered words.

17. The method of claim 11, wherein the scoring step comprises:
scoring each concept grouping based on the frequency that an element of the concept grouping appears in the unstructured object.

18. The method of claim 11, wherein the scoring step comprises:
scoring each concept grouping based on the position where an element of the concept grouping appears in the unstructured object.

19. The method of claim 11, wherein the scoring step comprises:
scoring each concept grouping based on part of speech usage of an element of the concept grouping in the unstructured object.

20. The method of claim 11, wherein the applying step comprises:
applying probabilistic analysis to the scores of the concept groupings to identify at least one relevant concept grouping, wherein the probabilistic analysis is Gaussian distribution analysis.

21. A computer-based method of processing a set of unstructured objects, comprising:
(1) selecting an unstructured object from the set of unstructured objects;
(2) automatically selecting at least one concept from the selected unstructured object without requiring user input to identify the concept;
(3) expanding each selected concept into at least one concept grouping, wherein a concept grouping contains elements consisting of a seed concept and at least one related concept;
(4) scoring each concept grouping to indicate the relevance of the concept grouping to the selected unstructured object;
(5) applying probabilistic analysis to the scores of the concept groupings to identify at least one relevant concept grouping, wherein for each relevant concept grouping, the seed concept of the relevant concept grouping is a key concept of the selected unstructured object and the score of the relevant concept grouping is the score of the key concept of the selected unstructured object, whereby at least one key concept is assigned to represent the selected unstructured object; and
(6) repeating steps (1)–(5) for each unstructured object in the set of unstructured objects.

22. The method of claim 21, wherein step (4) comprises:
scoring each concept grouping based on the frequency that an element of the concept grouping appears in the set of unstructured objects.

23. The method of claim 21, further comprising:
(7) creating a category for the set of unstructured objects, wherein a category comprises a name and a description.

24. The method of claim 23, wherein step (7) comprises:
(a) assigning a category-relevance value to each key concept in the set of unstructured objects, wherein a category-relevance value of a key concept indicates the relevance of the key concept to the set of unstructured objects;
(b) using the category-relevance values to select a set of key concepts; and
(c) assigning the set of key concepts as the description of the category.

25. The method of claim 24, further comprising:
(d) assigning at least one key concept in the set of key concepts as the name of the category.

26. The method of claim 24, wherein step (a) comprises:
assigning a category-relevance value to each key concept in the set of unstructured objects based on the frequency that the key concept appears in the set of unstructured objects.

27. The method of claim 24, wherein step (a) comprises:
assigning a category-relevance value to each key concept in the set of unstructured objects based on the scores of the key concepts of the set of unstructured objects.

28. The method of claim 24, wherein step (b) comprises:
applying probabilistic analysis to the category-relevance values to select a set of key concepts wherein the probabilistic analysis is Gaussian distribution analysis.

29. The method of claim 21, wherein step (5) further comprises:
assigning the selected unstructured object to at least one category from a set of categories.

30. The method of claim 29 wherein the assigning step comprises:
(a) selecting a category from the set of categories;
(b) calculating an object-relevance value for the selected unstructured object and the selected category, wherein the object-relevance value indicates the relevance of the unstructured object to the selected category;
(c) assigning the selected unstructured object to the selected category if the object-relevance value is greater than a threshold; and
(d) repeating steps (a)–(c) for each category in the set of categories.

31. The method of claim 30, wherein the calculating step comprises:
extracting category-concepts from the selected category wherein category-concepts are concepts extracted from the name and description of the selected category; and
calculating an object-relevance value based on the key concepts of the unstructured object, category-concepts of the selected category, and the frequency that category-concepts appear in the set of categories.

32. The method of claim 21, further comprising:
(7) using search text to retrieve from the set of unstructured objects a list of unstructured objects that are relevant to the search text.

33. The method of claim 32, wherein step (7) comprises:
(a) extracting search-concepts from the search text wherein search-concepts are concepts which represent the search text;
(b) calculating a search-relevance value for each unstructured object based on the search-concepts and the key concepts of the unstructured object, wherein a search-relevance value indicates the relevance of an unstructured object to the search text; and
(c) creating a list of unstructured objects wherein each unstructured object in the list has a search-relevance value greater than a threshold.

34. A computer program product comprising a computer useable medium having computer readable program code means embedded in said medium for causing a computer to process a set of unstructured objects, comprising:
first computer readable program code means for causing the computer to select an unstructured object from the set of unstructured objects;
second computer readable program code means for causing the computer to select at least one concept from the selected unstructured object without requiring user input to identify the concept;
third computer readable program code means for causing the computer to expand each selected concept into at least one concept grouping, wherein a concept grouping contains elements consisting of a seed concept and at least one related concept;
fourth computer readable program code means for causing the computer to score each concept grouping to indicate the relevance of the concept grouping to the selected unstructured object;
fifth computer readable program code means for causing the computer to apply probabilistic analysis to the scores of the concept groupings to identify at least one relevant concept grouping, wherein for each relevant concept grouping, the seed concept of the relevant concept grouping is a key concept of the selected unstructured object and the score of the relevant concept grouping is the score of the key concept of the selected unstructured object, whereby at least one key concept is assigned to represent the selected unstructured object; and
sixth computer readable program code means for causing the first through fifth computer readable program code means to assign a key concept to represent each unstructured object in the set of unstructured objects.

35. The computer program product of claim 34, further comprising:
seventh computer readable program code means for causing the computer to create a category for the set of unstructured objects, wherein a category comprises a name and a description.

36. The computer program product of claim 35, wherein the seventh computer readable program code means comprises:
eighth computer readable program code means for causing the computer to assign a category-relevance value to each key concept in the set of unstructured objects, wherein a category-relevance value of a key concept indicates the relevance of the key concept to the set of unstructured objects;
ninth computer readable program code means for causing the computer to use the category-relevance values to select a set of key concepts; and
tenth computer readable program code means for causing the computer to assign the set of key concepts as the description of the category.

37. The computer program product of claim 34, wherein the fifth computer readable program code means comprises:
seventh computer readable program code means for causing the computer to assign the selected unstructured object to at least one category from a set of categories.

38. The computer program product of claim 37 wherein the seventh computer readable program code means comprises:
eighth computer readable program code means for causing the computer to select a category from the set of categories;
ninth computer readable program code means for causing the computer to calculate an object-relevance value for the selected unstructured object and the selected category, wherein the object-relevance value indicates the relevance of the unstructured object to the selected category;
tenth computer readable program code means for causing the computer to assign the selected unstructured object to the selected category if the object-relevance value is greater than a threshold; and
eleventh computer readable program code means for causing the computer to cause the eighth through tenth computer program code means to repeat performance of their respective functions for each category in the set of categories.

39. The computer program product of claim 34, further comprising:
seventh computer readable program code means for causing the computer to use search text to retrieve a list of unstructured objects from the set of unstructured objects that are relevant to the search text.

40. The computer program product of claim 39, wherein the seventh computer readable program code means comprises:
eighth computer readable program code means for causing the computer to extract search-concepts from the search text wherein search-concepts are concepts which represent the search text;
ninth computer readable program code means for causing the computer to calculate a search-relevance value for each unstructured object based on the search-concepts and the key concepts of the unstructured object, wherein a search-relevance value indicates the relevance of an unstructured object to the search text; and
tenth computer readable program code means for causing the computer to create a list of unstructured objects wherein each unstructured object in the list has a search-relevance value greater than a threshold.

* * * * *